United States Patent [19]

Asama et al.

[11] Patent Number: 5,331,934
[45] Date of Patent: Jul. 26, 1994

[54] SPARK TIMING CONTROL SYSTEM FOR A VEHICLE-DRIVING INTERNAL COMBUSTION ENGINE

[75] Inventors: Hidehiko Asama; Kouichi Aoyama; Shuziro Morinaga; Shigenori Isomura; Toshio Kondo, all of Kariya, Japan

[73] Assignee: Nippondenso Co., Ltd., Kariya, Japan

[21] Appl. No.: 91,451

[22] Filed: Jul. 9, 1993

Related U.S. Application Data

[63] Continuation of Ser. No. 838,111, Feb. 20, 1992, abandoned.

[30] Foreign Application Priority Data

Feb. 20, 1991 [JP] Japan ................... 3-026542
Mar. 4, 1991 [JP] Japan ................... 3-037580

[51] Int. Cl.$^5$ ............................... F02P 5/00
[52] U.S. Cl. .................... 123/417; 123/422; 123/492
[58] Field of Search ............ 123/417, 422, 339, 423, 123/406, 419, 325, 492, 494, 682

[56] References Cited

U.S. PATENT DOCUMENTS

| | | | |
|---|---|---|---|
| 4,373,489 | 2/1983 | Yamaguchi | 123/422 |
| 4,760,822 | 8/1988 | Mieno et al. | 123/682 |
| 4,785,780 | 11/1988 | Kawaii | 123/339 |
| 4,909,224 | 3/1990 | Nishiyama et al. | 123/492 |
| 4,919,098 | 4/1990 | Shimada et al. | 123/422 |
| 4,924,832 | 5/1990 | Abe | 123/419 |
| 4,928,652 | 5/1990 | Shinya et al. | 123/417 |
| 4,982,709 | 1/1991 | Oota | 123/339 |
| 4,984,988 | 1/1991 | Mizushina et al. | 123/419 |
| 5,001,645 | 3/1991 | Williams et al. | 123/419 |
| 5,005,549 | 4/1991 | Pernpeintner et al. | 123/417 |
| 5,009,210 | 4/1991 | Nakagawa et al. | 123/682 |
| 5,078,112 | 1/1992 | Ikeura | 123/406 |
| 5,168,853 | 12/1992 | Kittleson et al. | 123/419 |
| 5,209,203 | 5/1993 | Kaltenbrunn et al. | 123/419 |

FOREIGN PATENT DOCUMENTS

| | | | |
|---|---|---|---|
| 59-704 | 1/1984 | Japan | 123/422 |
| 18336 | 1/1989 | Japan | 123/422 |
| 1121570 | 5/1989 | Japan | 123/422 |

*Primary Examiner*—Raymond A. Nelli
*Attorney, Agent, or Firm*—Cushman, Darby & Cushman

[57] ABSTRACT

A spark timing control system includes an engine state detecting device for detecting a state of an internal combustion engine. A vehicle vibration detecting device serves to detect a vibration of a vehicle in a longitudinal direction with respect to the vehicle. A target vehicle vibration value calculating device serves to calculate a target vehicle vibration value on the basis of one of results of detections by the engine state detecting device and the vehicle vibration detecting device. A control quantity setting device serves to set a control quantity of a spark timing so as to control the result of detection by the vehicle vibration detecting device at the target vehicle vibration value by use of an optimal feedback gain which is determined according to a dynamic model of the engine.

37 Claims, 18 Drawing Sheets

| SHIFT POSITION \ GAINS | $K_1$ | $K_2$ | $K_3$ | $K_4$ | $K_5$ | $K_a$ |
|---|---|---|---|---|---|---|
| 2nd-SPEED GEAR | -180 | 212 | -0.393 | -0.423 | -0.423 | 25.8 |
| 3rd-SPEED GEAR | 3.71 | 27.7 | -0.311 | -0.262 | -0.179 | 26.5 |

SPARK TIMING CONTROL SYSTEM FOR A VEHICLE-DRIVING INTERNAL COMBUSTION ENGINE

This is a continuation of application Ser. No. 07/838,111, filed on Feb. 20, 1992, which was abandoned upon the filing hereof.

BACKGROUND OF THE INVENTION

1. Field of the Invention

This invention relates to a spark timing (ignition timing) control system for a vehicle-driving internal combustion engine, and specifically relates to a spark timing control system designed so as to reducing the vibration of a vehicle. This invention also relates to a system for reducing the vibration of a vehicle through the control of a spark timing of a vehicle-driving engine.

2. Description of the Prior Art

In some vehicles, when a given decrease in the rotational speed of a vehicle-driving engine is required, the fuel supply to the engine is cut off. During a period after the fuel cutoff, when the fuel supply to the engine is restarted to accelerate the vehicle, the torque output of the engine abruptly increases so that the vehicle body tends to be exposed to a shock or an uncomfortable vibration.

Japanese published examined patent application 59-704, which corresponds to U.S. Pat. No. 4,373,489, discloses an engine spark timing control-system designed so as to reduce such a shock during the acceleration of the vehicle after the fuel cutoff. In the spark timing control system of Japanese patent application 59-704, during such an acceleration of the vehicle, the spark timing of a vehicle-driving engine is retarded from an optimal timing (a timing at which the engine output torque is maximized) to smooth an increase in the torque output of the engine. According to the prior art of Japanese patent application 59-704, the spark timing is controlled in response to only whether or not the engine is changing from the fuel cutoff state to the acceleration state.

In fact, the conditions of such a shock depend on not only whether or not the engine is changing from the fuel cutoff state to the acceleration state but also other various factors such as the engine load, the engine rotational speed, and the degree of the engine acceleration. Accordingly, in the spark timing control system of Japanese patent application 59-704, optimal spark timing control for reducing a shock tends to be difficult.

Japanese published unexamined patent application 1-121570 discloses a spark timing control system which includes a sensor for detecting a vehicle acceleration, a calculator for computing a variation in the detected vehicle acceleration, and a device for correcting a spark timing in accordance with the computed variation in the vehicle acceleration.

SUMMARY OF THE INVENTION

It is an object of this invention to provide an improved spark timing control system for a vehicle-driving internal combustion engine.

A first aspect of this invention provides a spark timing control system comprising engine state detecting means for detecting a state of an internal combustion engine; vehicle vibration detecting means for detecting a vibration of a vehicle in a longitudinal direction with respect to the vehicle; target vehicle vibration value calculating means for calculating a target vehicle vibration value on the basis of one of results of detections by the engine state detecting means and the vehicle vibration detecting means; and control quantity setting means for setting a control quantity of a spark timing so as to control the result of detection by the vehicle vibration detecting means at the target vehicle vibration value by use of an optimal feedback gain which is determined according to a dynamic model of the engine.

A second aspect of this invention provides a spark timing control system comprising engine state detecting means for detecting a state of an internal combustion engine; vehicle vibration detecting means for detecting a vibration of a vehicle in a longitudinal direction with respect to the vehicle; target vehicle vibration value calculating means for calculating a target vehicle vibration value on the basis of at least one of results of detections by the engine state detecting means and the vehicle vibration detecting means; and control quantity setting means for setting a control quantity of a spark timing so as to control the result of detection by the vehicle vibration detecting means at the target vehicle vibration value.

A third aspect of this invention provides a system for controlling a vehicle driven by a spark-ignition engine, wherein an acceleration of the vehicle depends on a spark timing of the engine, the system comprising means for detecting an actual acceleration of the vehicle; means for determining a target acceleration of the vehicle; and means for controlling a spark timing of the engine in response to a difference between the actual acceleration and the target acceleration so that the actual acceleration will follow the target acceleration.

A fourth aspect of this invention provides a system for controlling a vehicle driven by a spark-ignition engine, wherein an acceleration of the vehicle depends on a spark timing of the engine, the system comprising means for detecting an actual acceleration of the vehicle; means for determining a target acceleration of the vehicle; means for determining a first component of a current desired spark timing in response to the detected actual acceleration; means for determining a second component of the current desired spark timing in response to a previous desired spark timing; means for determining a third component of the current desired spark timing in response to a difference between the detected actual acceleration and the determined target acceleration; and means for controlling an actual spark timing of the engine in accordance with the current desired spark timing.

DESCRIPTION OF THE FIRST PREFERRED EMBODIMENT

Figure 1:
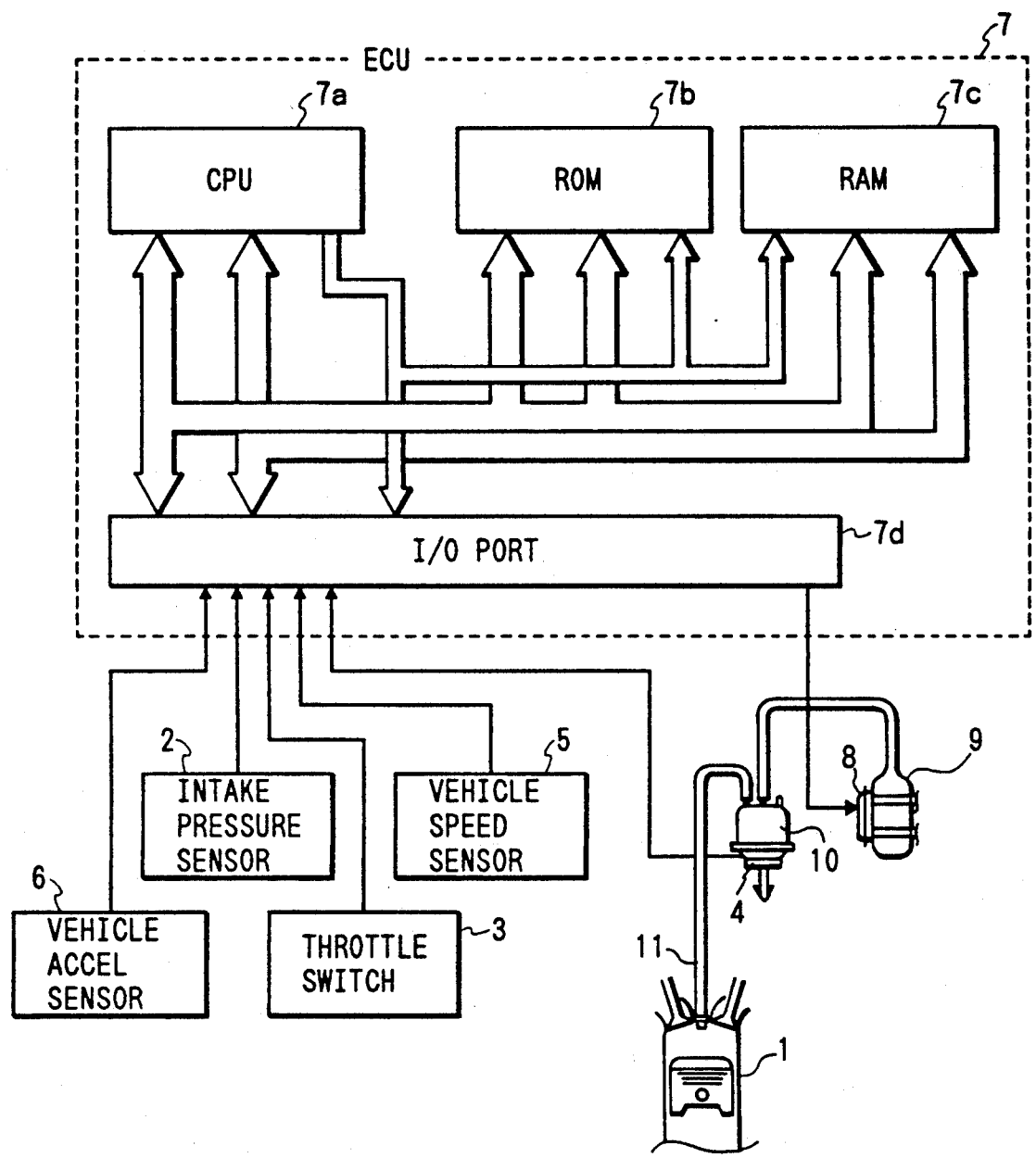
FIG. 1 is a diagram of a spark timing control system according to a first embodiment of this invention.

With reference to FIG. 1, the numeral 1 denotes a spark-ignition internal combustion engine for driving a vehicle. The engine 1 has an air intake duct in which a throttle valve (not shown) is disposed. A sensor 2 functions to detect the pressure in the portion of the air intake duct downstream of the throttle valve. The intake duct pressure sensor 2 serves as means for detecting a load on the engine 1. A throttle switch 3 connected to the throttle valve detects whether or not the throttle valve is fully closed. A sensor 4 associated with the output shaft (the crankshaft) of the engine 1 detects the angular position of the engine output shaft, that is, the crank angle. The output signal from the crank angle sensor 4 depends on the rotational speed of the engine 1, and the rotational speed of the engine 1 is calculated on the basis of the output signal from the crank angle sensor 4. The crank angle sensor 4 serves as means for detecting the engine rotational speed. The output signals from the intake duct pressure sensor 2, the throttle switch 3, and the crank angle sensor 4 are transmitted to an I/O port 7d within an electronic control unit (ECU) 7.

A sensor 5 serves to detect the speed of the body of the vehicle. An acceleration sensor 6 mounted on the vehicle body detects the acceleration of the vehicle body in the longitudinal direction of the vehicle body. The vehicle acceleration sensor 6 serves as means for detecting the vibration of the vehicle. The vehicle acceleration sensor 6 is also referred to as the G sensor. The output signals from the vehicle speed sensor 5 and the vehicle acceleration sensor 6 are transmitted to the I/O port 7d within the ECU 7.

The ECU 7 constitutes means for calculating a target value of vehicle vibration, and means for setting a control quantity. Specifically, the ECU 7 calculates a control quantity of a spark timing on the basis of the output signals from the sensors and the switch 2–6, and generates a control signal in accordance with the calculated spark timing control quantity and outputs the generated control signal to an igniter described later. The ECU 7 includes a microcomputer having a combination of a central processing unit (CPU) 7a, a read only memory (ROM) 7b, a random access memory (RAM) 7c, and the I/O port 7d. Specifically, the CPU 7a executes calculations for the control of the vibration or acceleration of the vehicle. The ROM 7b stores a control program, and data representing control constants used in the calculations. The control program determines the operation of the CPU 7a. The RAM 7c temporarily stores calculation data during the operation of the CPU 7a. The I/O port 7d enables inputting and outputting signals into and from the ECU 7.

An igniter 8 including an ignition coil assembly 9 serves to generate a high tension for the ignition. Specifically, the igniter 8 periodically interrupts an electric current through the primary winding of the ignition coil assembly 9 in response to the output control signal from the ECU 7, generating ignition pulse voltages across the secondary winding of the ignition coil assembly 9. The generated ignition pulse voltages are distributed to spark plugs 11 of cylinders of the engine 1 by a distributor 10.

The ECU 7 functions to execute the spark timing control for reducing the vibration of the vehicle, and the characteristics of the spark timing control are previously designed by using a technique described later. The designing technique is similar to that disclosed in Japanese published unexamined patent application 64-8336 which corresponds to U.S. Pat. No. 4,785,780.

(1) Modeling of Controlled Object

A dynamic model of the system for reducing the vibration of the vehicle is determined, through approximation, on the basis of an auto-regressive moving average model having an order [m, n] (m=2, n=1) and a dead time p=3. In addition, a disturbance is taken into consideration in the approximation for determining the dynamic model of the system. The dynamic model of the vibration reducing system is approximated by using the following equation.

$$G(i+1) = a_1 G(i) + a_2 G(i-1) + b_1 u(i-3) \tag{1}$$

where G denotes a vehicle vibration (a vehicle acceleration); "u" denotes a vehicle vibration corrective coefficient; $a_1$, $a_2$, and $b_1$ denote model constants; and "i" is a variable representing the number of times of sampling which corresponds to the moment of sampling. In view of a disturbance "d", the equation (1) is modified as follows.

$$G(i+1) = a_1 G(i) + a_2 G(i-1) + b_1 u(i-3) + d(i) \tag{2}$$

It is easy to experimentally determine the model constants $a_1$, $a_2$, and $b_1$ by using a step response technique with respect to the dynamic model corresponding to the equation (2), and thereby calculating the transfer function of the system for controlling the spark timing. The determination of the model constants $a_1$, $a_2$, and $b_1$ results in the determination of the dynamic model of the spark timing control system.

(2) Method of Representing State Variables IX

State variables or a state variable vector IX is now defined as follows.

$$IX(i) = [X_1(i), X_2(i), X_3(i), X_4(i), X_5(i)]^T \tag{3}$$

where the superscript T denotes the transposed matrix (vector). When the state variables IX are used, the equation (2) is rewritten as follows.

$$\begin{bmatrix} X_1(i+1) \\ X_2(i+1) \\ X_3(i+1) \\ X_4(i+1) \\ X_5(i+1) \end{bmatrix} = \begin{bmatrix} a_1 & a_2 & 0 & 0 & b_1 \\ 1 & 0 & 0 & 0 & 0 \\ 0 & 0 & 0 & 0 & 0 \\ 0 & 0 & 1 & 0 & 0 \\ 0 & 0 & 0 & 1 & 0 \end{bmatrix} \begin{bmatrix} X_1(i) \\ X_2(i) \\ X_3(i) \\ X_4(i) \\ X_5(i) \end{bmatrix} + \begin{bmatrix} 0 \\ 0 \\ 1 \\ 0 \\ 0 \end{bmatrix} u(i) + \begin{bmatrix} 1 \\ 0 \\ 0 \\ 0 \\ 0 \end{bmatrix} d(i) \tag{4}$$

The equation (4) is solved, and then the following relation is introduced.

$$X_1(i+1) = a_1 X_1(i) + a_2 X_2(i) + b_1 X_5(i) + d(i) = G(i+1) \tag{5}$$

As a result, the state variables are expressed as follows.

$$X_1(i) = G(i)$$

$$X_2(i) = G(i-1)$$

$$X_3(i) = u(i-1)$$

$$X_4(i) = u(i-2)$$

$$X_5(i) = u(i-3) \tag{6}$$

(3) Designing of Integral-added Regulator

A regulator is designed by using the equations (3) and (6). Feedback gains (a feedback gain vector) $IK = [K_1, K_2, K_3, K_4, K_5]$ and the state variables $IX(i) = [G(i), G(i), u(i-1), u(i-2), u(i-3)]^T$ are used, and thus the following relation is obtained.

$$\begin{aligned} u(i) &= IK \cdot IX(i) \\ &= K_1 \cdot G(i) + K_2 \cdot G(i-1) + K_3 \cdot u(i-1) + \\ &\quad K_4 \cdot u(i-2) + K_5 \cdot u(i-3) \end{aligned} \tag{7}$$

When an integral term D(i) for absorbing errors is added, the equation (7) is modified into the following equation.

$$u(i) = K_1 \cdot G(i) + K_2 \cdot G(i-1) + K_3 \cdot u(i-1) + K_4 \cdot u(i-2) + K_5 \cdot u(i-3) + D(i) \tag{8}$$

In this way, the vehicle vibration corrective coefficient "u" is determined. The integral term D(i) corresponds to the accumulation of the difference between a target vehicle vibration (acceleration) value $G_{TG}$ and an actual vehicle vibration (acceleration) value G(i). Specifically, the integral term D(i) is expressed by the following equation.

$$D(i) = D(i-1) + Ka\{G_{TG} - G(i)\} \tag{9}$$

where Ka denotes an integral constant.

Figure 2:
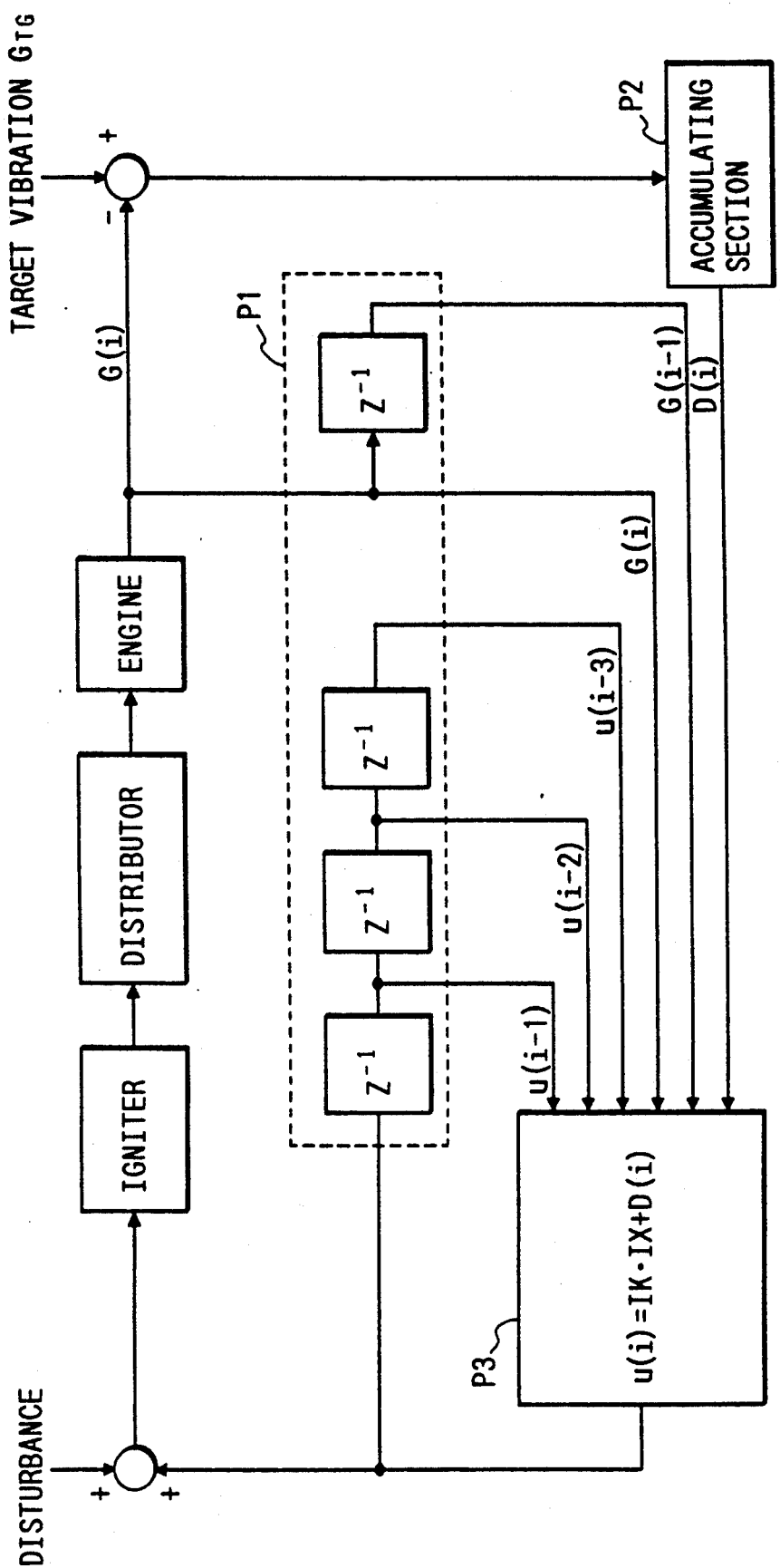
FIG. 2 is a block diagram of the system in FIG. 1.

FIG. 2 is a block diagram of the system for reducing the vehicle vibration which is designed as described previously. In FIG. 2, a block P1 shown by the broken lines corresponds to the section of the system which determines the state variables IX(i) under conditions where the actual vehicle vibration value G is feedback-controlled at the target vehicle vibration value $G_{TG}$. A block P2 corresponds to the accumulating section of the system which calculates the integral term D(i). A block P3 corresponds to the section of the system which calculates the current vehicle vibration corrective coefficient "u" from the state variables IX(i) and the integral term D(i) determined by the blocks P1 and P2 respectively. In addition, blocks of $Z^{-1}$ transform represent functions of deriving the values u(i−1), u(i−2), u(i−3), and G(i−1) from the values u(i), u(i−1), u(i−2), and G(i) respectively. For example, the $Z^{-1}$ transform block deriving the value u(i−1) from the value u(i) corresponds to the fact that the value u(i−1) used in a certain execution cycle (a certain moment) of the control has been stored in the RAM 7c, and the value u(i−1) is read out from the RAM 7c and is used in the next execution cycle (the next moment) of the control. The other $Z^{-1}$ transform blocks correspond to similar facts.

(4) Determination of Optimal Feedback Gains IK

Optimal feedback gains (an optimal feedback gain vector) IK and an optimal integral constant Ka can be determined by minimizing the following performance index or function J.

$$J = \sum_{i=0}^{\infty} [Q\{G(i) - G_{TG}\}^2 + R\{u(i) - u(i-1)\}^2] \quad (10)$$

where Q and R denote weight parameters. The performance index J is intended to minimize the deviation of the actual vehicle vibration G from the target vehicle vibration $G_{TG}$ while restricting the motion of the vehicle vibration corrective coefficient u(i). The weight to the restriction on the vehicle vibration corrective coefficient u(i) can be varied in accordance with the weight parameters Q and R. In general, the optimal feedback gains IK and the optimal integral constant Ka are determined by changing the weight parameters Q and R and repeating simulation until optimal control characteristics are obtained. In addition, the optimal feedback gains IK and the optimal integral constant Ka depend on the model constants $a_1$, $a_2$, and $b_1$. Accordingly, to ensure the system stability (robustness) against variations (parameter variations) in the system controlling the vehicle vibration G, it is necessary to consider variations of the model constants $a_1$, $a_2$, and $b_1$ in the designing of the optimal feedback gains IK and the optimal integral constant Ka. Thus, the simulation is performed while variations of the model constants $a_1$, $a_2$, and $b_1$ which can actually occur are considered, so that the optimal feedback gains IK and the optimal integral constant Ka capable of satisfying the stability are obtained.

The previously-mentioned modeling of the controlled object, method of representing the state variables IX, designing of the integral-added regulator, and determination of the optimal feedback gains IK are performed beforehand. The ECU 7 merely uses the results of these processes, and executes the spark timing control by referring to the equations (8) and (9).

The ECU 7 operates in accordance with a program stored in the ROM 7b. The program includes a main routine and various control and decision routines, one of which is a spark timing control routine. The spark timing control routine is reiterated at a given period, for example, a period of 8 ms, by a timer-based interruption process.

Figure 3:
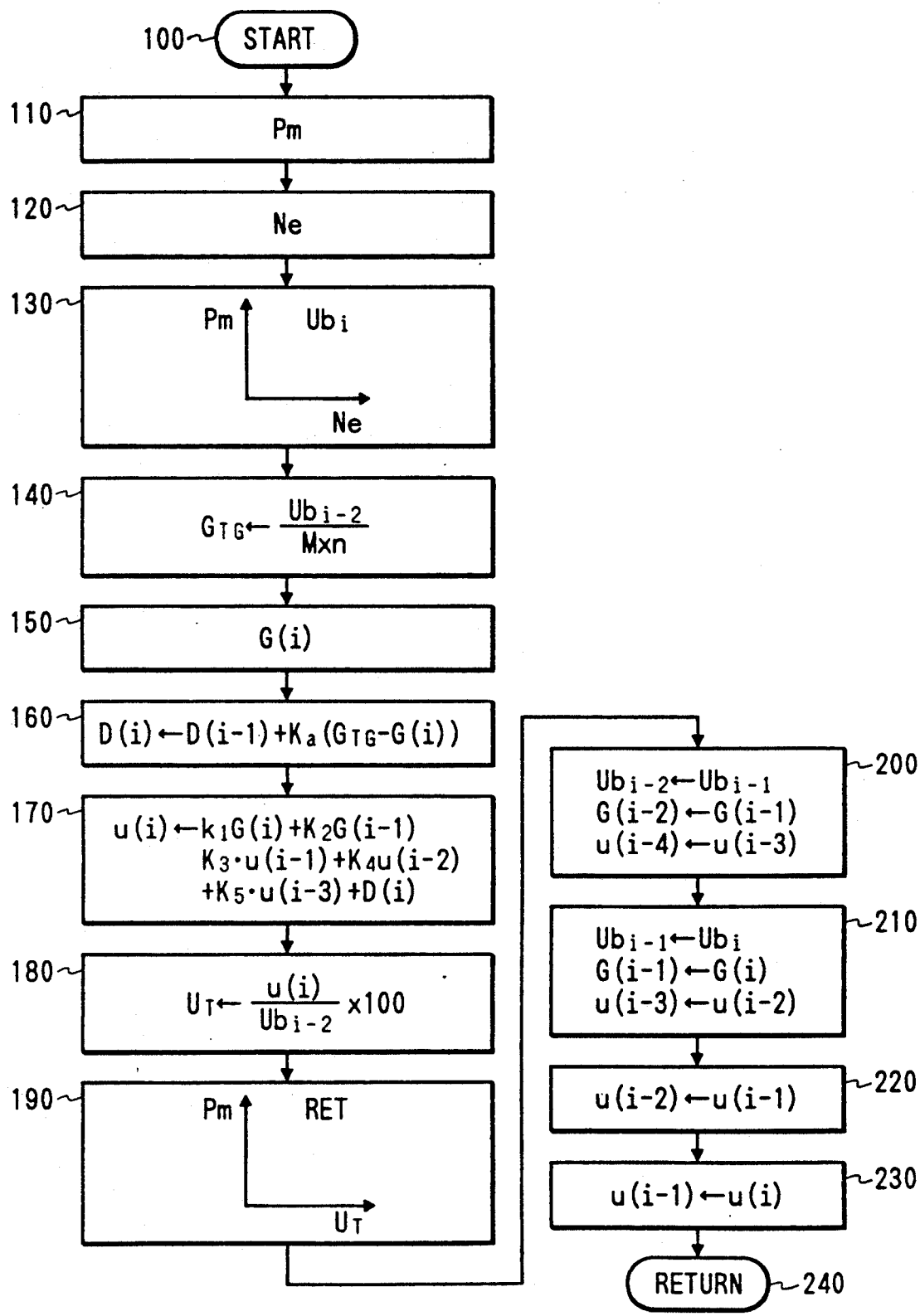
FIG. 3 is a flowchart of a part of a program controlling the ECU in FIG. 1.

FIG. 3 is a flowchart of the spark timing control routine. As shown in FIG. 3, the spark timing control routine starts at a step 100 and then advances to a step 110.

The step 110 reads out the current value Pm of an intake duct pressure from an analog-to-digital converter within the I/O port 7d which converts the output signal from the intake duct pressure sensor 2 into a corresponding digital signal. A step 120 following the step 110 derives the current value Ne of an engine rotational speed by referring to the output signal from the crank angle sensor 4.

Figure 4:
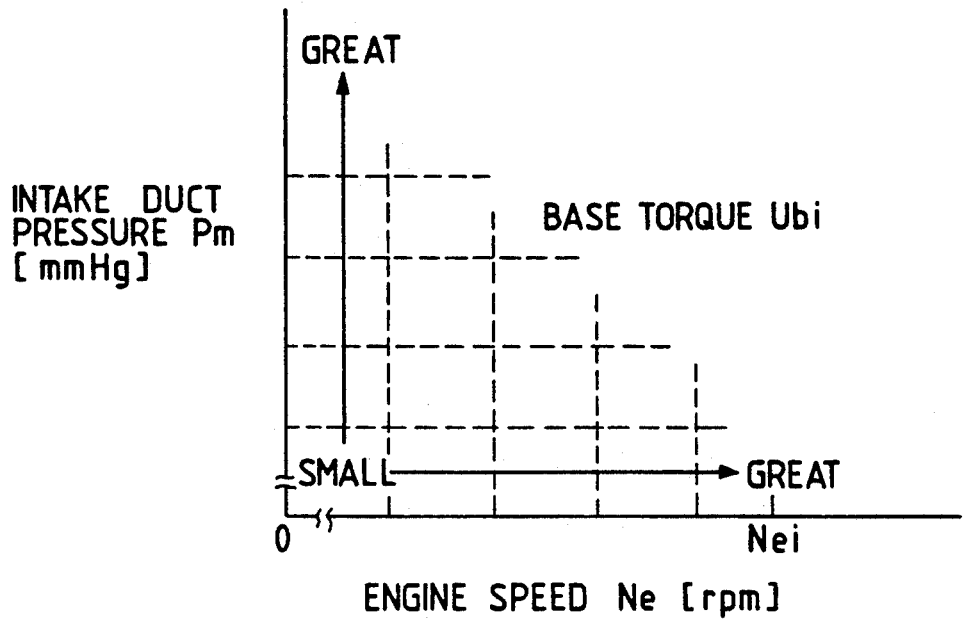
FIG. 4 is a diagram showing a two-dimensional map for setting a base torque Ubi.

A step 130 following the step 120 determines a base torque Ubi in response to the current intake duct pressure Pm and the current engine speed Ne. Specifically, the ROM 7b has a two-dimensional table or map such as shown in FIG. 4 in which predetermined values of the base toque are plotted as a function of the intake duct pressure and the engine speed. The base torque Ubi is determined by referring to the two-dimensional map of FIG. 4. The base torque Ubi is defined as being equal to an engine output torque which occurs at a non-retarded spark timing. The two-dimensional map of FIG. 4 is designed so that the base torque Ubi will increase as the intake duct pressure Pm rises or the engine speed Ne rises to a given engine speed Nei.

A step 140 subsequent to the step 130 calculates a target vehicle vibration (acceleration) value $G_{TG}$ by referring to the following equation.

$$G_{TG} = U_{bi-2}/M \cdot n \quad (11)$$

where $U_{bi-2}$ denotes the base torque calculated in the execution cycle of the program which precedes the current execution cycle of the program by two cycles, and M denotes the weight of the vehicle and "n" denotes the gear ratio in the power transmission of the vehicle. Since the base torque Ubi is determined in accordance with the engine speed Ne and the intake duct pressure Pm which is detected by the sensor 2 in the previous step 130, there occurs a given time lag between the determined base torque Ubi and the actually-generated engine output torque. To compensate for such a time lag, the step 140 uses the previous base torque $U_{bi-2}$ in the calculation of the target vehicle vibration $G_{TG}$.

A step 150 following the step 140 reads out the current value Gi of an actual vehicle vibration (acceleration) from an analog-to-digital converter within the I/O port 7d which converts the output signal from the vehicle acceleration sensor 6 into a corresponding digital signal.

A step 160 following the step 150 calculates an integral term D(i) by referring to the previously-mentioned equation (9). It should be noted that the integral constant Ka is equal to a predetermined fixed value.

A step 170 following the step 160 calculates a control torque u(i), corresponding to a spark timing control quantity, by referring to the previously-mentioned equation (8).

A step 180 following the step 170 calculates a torque generation rate $U_T$ from the control torque u(i) and the previous base torque $U_{bi-2}$ by referring to the following equation.

$$U_T = \{u(i)/U_{bi-2}\} \cdot 100 \quad (12)$$

Figure 5:
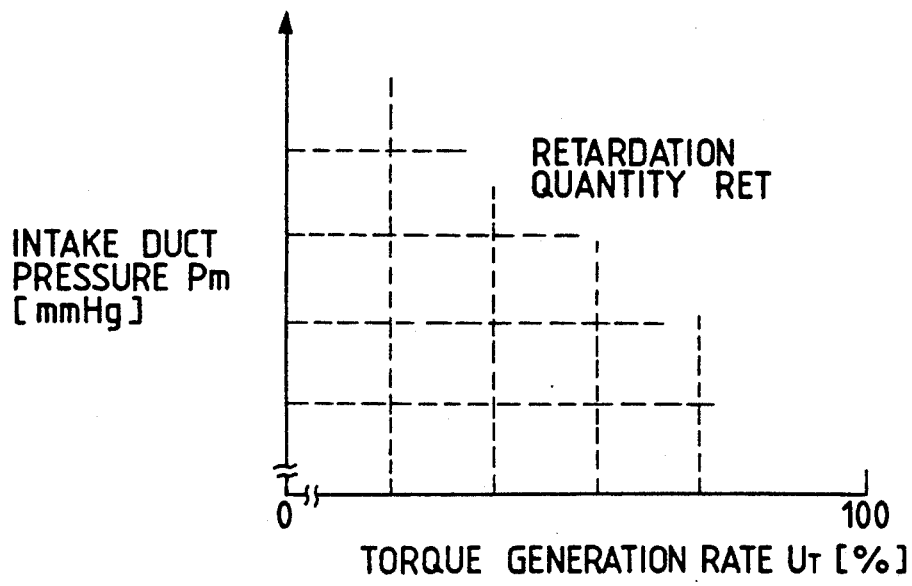
FIG. 5 is a diagram showing a two-dimensional map for setting a spark timing retardation quantity RET.

A step 190 following the step 180 determines a spark timing retardation quantity RET in response to the torque generation rate $U_T$ and the intake duct pressure Pro. Specifically, the ROM 7b has a two-dimensional table or map such as shown in FIG. 5 in which predetermined values of the spark timing retardation quantity are plotted as a function of the torque generation rate and the intake duct pressure. The spark timing retardation quantity RET is determined by referring to the two-dimensional map of FIG. 5. The two-dimensional map of FIG. 5 is designed so that the spark timing retardation quantity RET will decrease as the torque generation rate $U_T$ or the intake duct pressure Pm increases. The step 190 stores the determined spark timing retardation quantity RET into the RAM 7c.

A step 200 following the step 190 updates the previous values $U_{bi-2}$, G(i−2), and u(i−4). Specifically, the base torque $U_{bi-1}$ which immediately precedes the current base torque Ubi is stored into the RAM 7c as the base torque $U_{bi-2}$ which precedes the current base torque Ubi by two time positions. The actual vehicle vibration value G(i−1) which immediately precedes the current actual vehicle vibration value G(i) is stored into the RAM 7c as the actual vehicle vibration value G(i−2) which precedes the current actual vehicle vibration value G(i) by two time positions. The control torque u(i−3) which precedes the current control torque u(i) by three time positions is stored into the RAM 7c as the control torque u(i−4) which precedes the current control torque u(i) by four time positions.

A step 210 following the step 200 updates the previous values $U_{bi-1}$, G(i−1), and u(i−3). Specifically, the current base torque Ubi is stored into the RAM 7c as the base torque $U_{bi-1}$ which immediately precedes the current base torque Ubi. The current actual vehicle vibration value G(i) is stored into the RAM 7c as the actual vehicle vibration value G(i−1) which immediately precedes the current actual vehicle vibration value G(i). The control torque u(i−2) which precedes the current control torque u(i) by two time positions is stored into the RAM 7c as the control torque u(i−3) which precedes the current control torque u(i) by three time positions.

A step 220 following the step 210 updates the previous control torque u(i−2). Specifically, the control torque u(i−1) which immediately precedes the current control torque u(i) is stored into the RAM 7c as the control torque u(i−2) which precedes the current control torque u(i) by two time positions.

A step 230 following the step 220 updates the previous control torque u(i−1). Specifically, the current control torque u(i) is stored into the RAM 7c as the control torque u(i−1) which immediately precedes the current control torque u(i). After the step 230, the program advances to a step 240 and then returns to the main routine.

The program for controlling the ECU 7 includes a spark timing decision routine which is reiterated at a given period corresponding to a given crank angle, for example, 30 degrees in crank angle, by an interruption process responsive to the output signal from the crank angle sensor 4.

Figure 6:
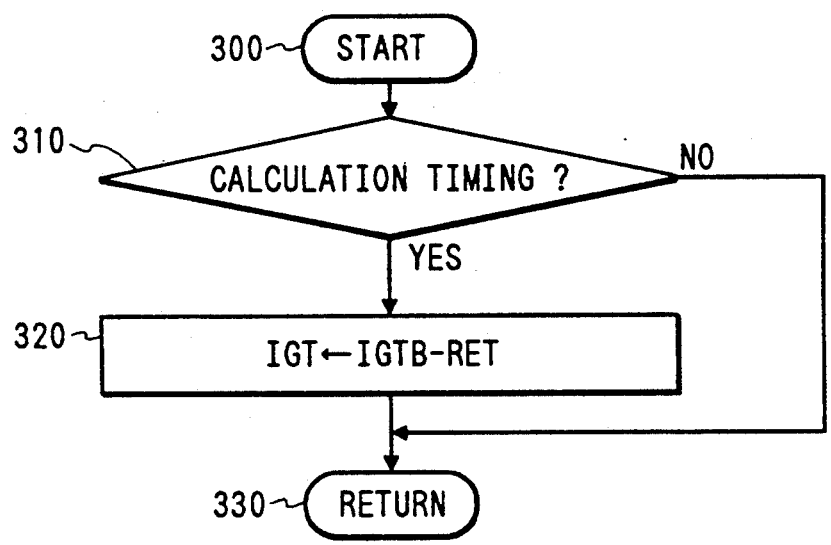
FIG. 6 is a flowchart of another part of the program controlling the ECU in FIG. 1.

FIG. 6 is a flowchart of the spark timing decision routine. As shown in FIG. 6, the spark timing decision routine starts at a step 300 and then advances to a step 310.

The step 310 judges whether or not the present moment agrees with a given timing for the calculation of a spark timing. When the present moment agrees with the given timing, the program advances to a step 320. When the present moment disagrees with the given timing, the program jumps to a step 330 and then returns to the main routine.

The step 320 calculates a desired spark timing IGT which equals a basic spark timing IGTB minus the spark timing retardation quantity RET. Specifically, the desired spark timing IGT is calculated by referring to the equation "IGT=IGTB−RET". The basic spark timing IGTB is determined in another routine of the program which is not shown. The spark timing retardation quantity RET is calculated in the routine of FIG. 3. After the step 320, the program advances to the step 330 and then returns to the main routine.

The ECU 7 generates a control signal to the igniter 8 in accordance with the desired spark timing IGT so that an actual spark timing will be equal to the desired spark timing IGT.

Figure 7:
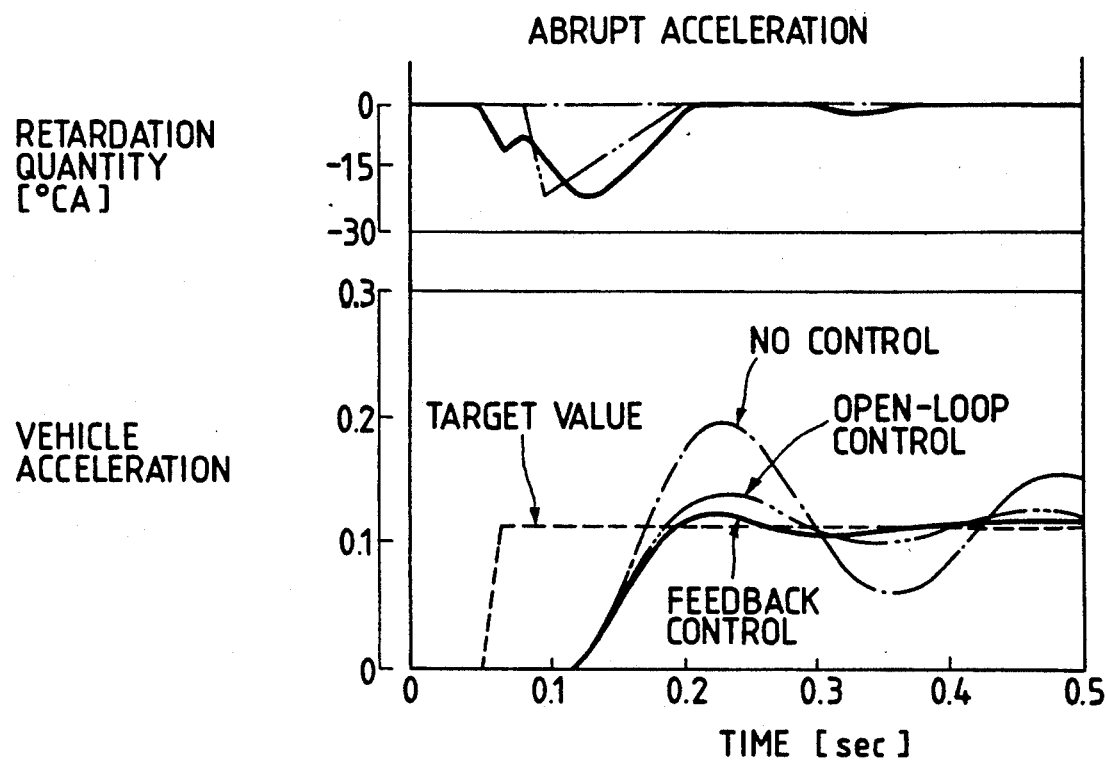
FIG. 7 is a time-domain diagram showing variations in a spark timing retardation quantity, and target and actual vehicle accelerations which occur under abruptly-accelerating conditions.
Figure 8:
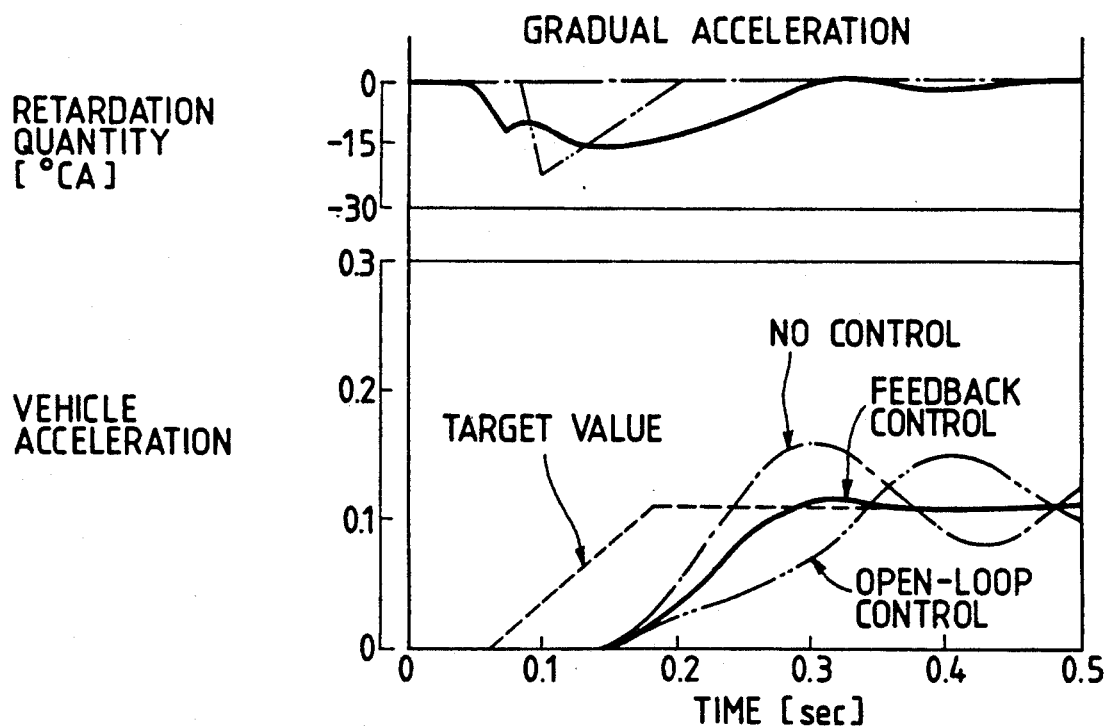
FIG. 8 is a time-domain diagram showing variations in a spark timing retardation quantity, and target and actual vehicle accelerations which occur under gradually-accelerating conditions.

FIG. 7 shows the characteristics of the system of this embodiment which occur during an abrupt acceleration of the vehicle. FIG. 8 shows the characteristics of the system of this embodiment which occur during a gradual acceleration of the vehicle. In FIGS. 7 and 8: the dash lines denote the characteristics of the target vehicle vibration value $G_{TG}$; the solid lines denote the characteristics of the spark timing retardation quantity RET and the actual vehicle vibration which are obtained in the feedback control by the system of this embodiment; the two-dot/dash lines denote the characteristics of the spark timing retardation quantity and the actual vehicle vibration which are obtained in prior art open-loop control; and the one-dot/dash lines denote the characteristics of the spark timing retardation quantity and the actual vehicle vibration which are obtained in the absence of any control. According to the prior art open-loop control, the spark timing is retarded by a given quantity upon the detection of a vehicle acceleration, and then the spark timing retardation quantity is decreased at a given rate.

As shown in FIGS. 7 and 8, under both the abrupt acceleration of the vehicle and the gradual acceleration of the vehicle, the characteristic curve of the actual vehicle vibration obtained by the system of this embodiment is closer to the characteristic curve of the desired vehicle vibration than the characteristic curve of the actual vehicle vibration obtained by the prior art open-loop control system is. Specifically, since the system of this embodiment executes the control of the spark timing retardation quantity in response to the vehicle running conditions while the prior art open-loop control executes the fixed-quantity spark timing retardation independent of the vehicle running conditions, the system of this embodiment enables the actual vehicle vibration to reach the desired vehicle vibration more quickly than the prior art open-loop control system does. The system of this embodiment is more advantageous than the prior art open-loop control in response characteristics and stability characteristics. Therefore, the system of this embodiment can effectively reduce the vehicle vibrations.

As described previously, according to the system of this embodiment, the target vehicle vibration $G_{TG}$ is calculated while the actual vehicle vibration G is detected, and the actual vehicle vibration G is feedback-controlled at the target vehicle vibration $G_{TG}$ by adjusting the spark timing retardation quantity in response to the vehicle running conditions. The system of this embodiment can effectively reduce vehicle vibrations under vehicle accelerations of various types.

It should be noted that this embodiment may be modified in various ways. For example, while the target vehicle vibration value $G_{TG}$ is determined on the basis of the output signals from the intake duct pressure sensor 2 and the crank angle sensor 4 in this embodiment, the target vehicle vibration value $G_{TG}$ may be determined on the basis of a fuel injection mount or a fuel injection timing and the output signal from a throttle-valve angular position sensor.

DESCRIPTION OF THE SECOND PREFERRED EMBODIMENT

A second embodiment of this invention is similar to the embodiment of FIGS. 1-8 except for design changes described hereinafter. The second embodiment is designed so as to compensate for irregular high-frequency components of the output signal from a vehicle acceleration sensor 6 (see FIG. 1) which are generally caused by road noise. For example, such road noise is generated when a vehicle travels on a rough road.

In the second embodiment, a program for controlling an ECU 7 (see FIG. 1) includes a feedback gain changing routine. The feedback gain changing routine is reiterated at a given period by a timer-based interruption process.

Figures 9, 10:
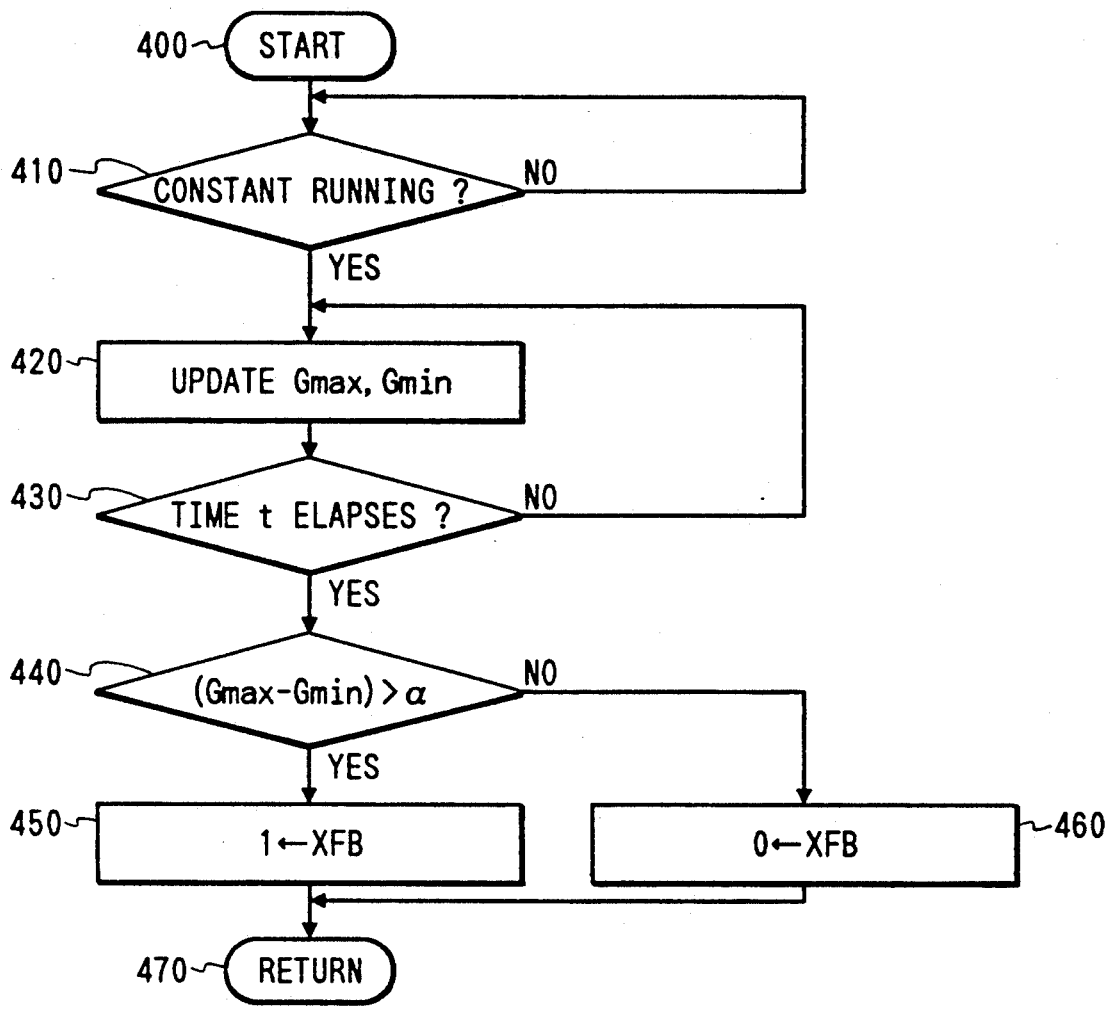
FIG. 9 is a flowchart of a part of a program controlling an ECU in a spark timing control system according to a second embodiment of this invention.
FIG. 10 is a diagram showing the relation of an XFB flag with optimal feedback gains and an optimal integral constant in the second embodiment.

FIG. 9 is a flowchart of the feedback gain changing routine. As shown in FIG. 9, the feedback gain changing routine starts at a step 400 and then advances to a step 410.

The step 410 judges whether or not the vehicle is running under constant conditions. For example, such constant running conditions are detected by referring to the output signal from a throttle-valve angular position sensor or a throttle switch 3 (see FIG. 1). When the vehicle is judged to be running under constant conditions, the program advances to a step 420. Otherwise, the program returns to the step 410.

The step 420 derives the maximum value Gmax and the minimum value Gmin of the output signal from the vehicle acceleration sensor 6 (see FIG. 1) which represents an actual vehicle vibration.

A step 430 following the step 420 judges whether or not a given time "t" has elapsed since the moment of the occurrence of the advance of the program from the step 410 to the step 420, that is, the moment of the first execution of the step 420. When the given time "t" has not elapsed yet, the program returns to the step 420. When the given time "t" has elapsed, the program advances to a step 440.

The steps 420 and 430 cooperate to update the maximum value Gmax and the minimum value Gmin of the output signal from the vehicle acceleration sensor 6 (see Fig. 1), deriving the true maximum value Gmax and the true minimum value Gmin during the given time "t". The derived true maximum value Gmax and the derived true minimum value Gmin are stored into a RAM 7c (see FIG. 1).

The step 440 calculates a difference between the maximum value Gmax and the minimum value Gmin. Then, the step 440 judges whether or not the calculated difference is greater than a given value "α". When the difference is greater than the given value "α", that is, when the vehicle acceleration sensor 6 is subjected to great road noise, the program advances to a step 450 which sets a flag XFB to "1". When the difference is not greater than the given value "α", that is, when the vehicle acceleration sensor 6 is subjected to small road noise, the program advances to a step 460 which sets the flag XFB to "0".

After the steps 450 and 460, the program advances to a step 470 and the current execution cycle of the feedback gain changing routine ends.

As shown in FIG. 10, optimal feedback gains IK (K1, K2, K3, K4, K5) and an optimal integral constant Ka which are used in a spark timing control routine (see FIG. 3) are changed in dependence upon whether the flag XFB is "1" or "0", that is, whether or not the road noise is great. The optimal feedback gains K1, K2, K3, K4, and K5, and the optimal integral constant Ka set when the flag XFB is "1" are suitable for conditions including great road noise. The optimal feedback gains K1, K2, K3, K4, and K5, and the optimal integral constant Ka set when the flag XFB is "0" are suitable for conditions including small road noise.

Figure 11:
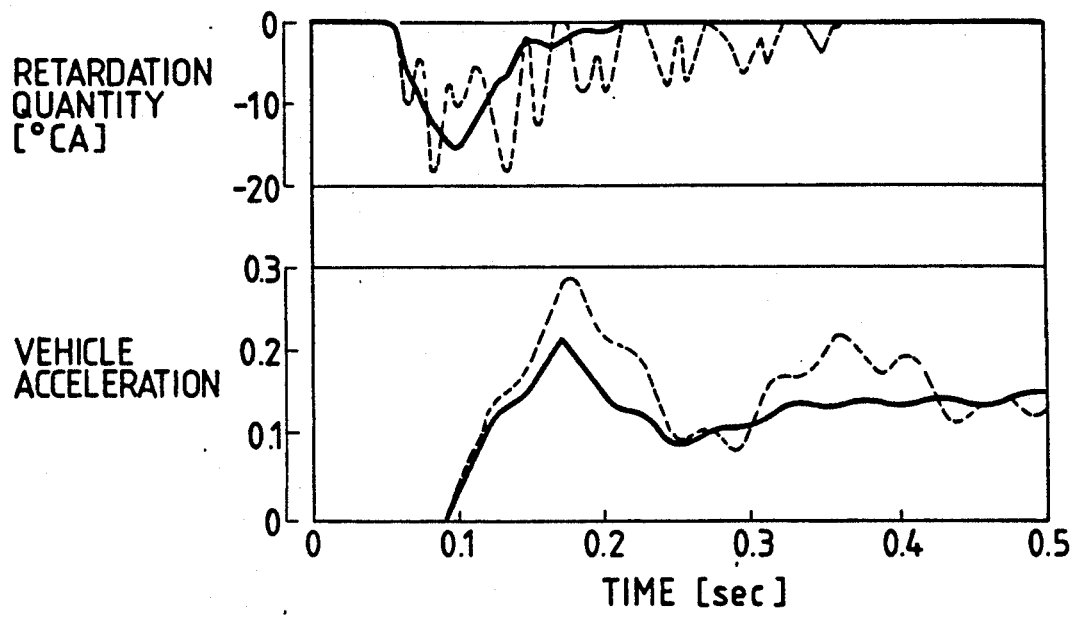
FIG. 11 is a time-domain diagram showing variations in a spark timing retardation quantity and an actual vehicle acceleration in connection with the second embodiment.
Figure 12:
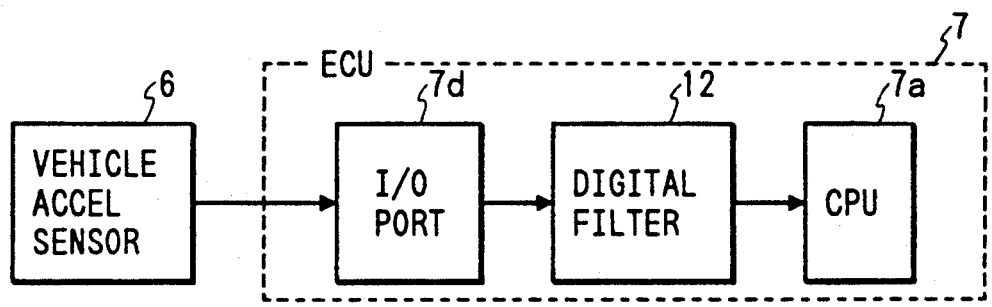
FIG. 12 is a block diagram of a part of a spark timing control system according to a third embodiment.

FIG. 11 shows time-domain variations in a spark timing retardation quantity and an actual vehicle acceleration which are obtained in the presence and absence of the change of the optimal feedback gains K1, K2, K3, K4, and K5, and the optimal integral constant Ka under conditions where the vehicle is accelerated on a road providing great road noise. In FIG. 11, the solid lines denote the time-domain variations in the spark timing retardation quantity and the actual vehicle acceleration which are obtained in the presence of the change of the optimal feedback gains K1, K2, K3, K4, and K5, and the optimal integral constant Ka according to the second embodiment of this invention. In FIG. 12, the dash lines denote the time-domain variations in the spark timing retardation quantity and the actual vehicle acceleration which are obtained in the absence of the change of the optimal feedback gains K1, K2, K3, K4, and K5, and the optimal integral constant Ka.

According to the second embodiment, during a vehicle acceleration under conditions including great road noise, the optimal feedback gains and the optimal integral constant are changed to the values designed so as to compensate for the adverse affection of the great road noise on the vehicle acceleration sensor 6 (see FIG. 1), it is possible to prevent erroneous control of the spark timing retardation which would be caused by the great road noise.

DESCRIPTION OF THE THIRD PREFERRED EMBODIMENT

A third embodiment of this invention is similar to the embodiment of FIGS. 1-8 except for design changes described hereinafter. The third embodiment is designed so as to compensate for irregular high-frequency components of the output signal from a vehicle acceleration sensor 6 (see FIG. 1) which are generally caused by road noise. For example, such road noise is generated when a vehicle travels on a rough road.

FIG. 12 shows an essential part of the third embodiment. As shown in FIG. 12, the third embodiment includes a digital filter 12 connected between an I/O port 7d and a CPU 7a within an ECU 7. The analog output signal from a vehicle acceleration sensor 6 is converted into a corresponding digital signal by an analog-to-digital converter within the I/O port 7d. The digital vehicle acceleration signal is transmitted from the I/O port 7d to the digital filter 12, being processed by the digital filter 12 and then being fed to the CPU 7a.

The digital filter 12 serves to select fundamental frequency components of the digital vehicle acceleration signal which accurately represent the vehicle acceleration, but remove high-frequency components of the digital vehicle acceleration signal which are caused by road noise.

Figure 13:
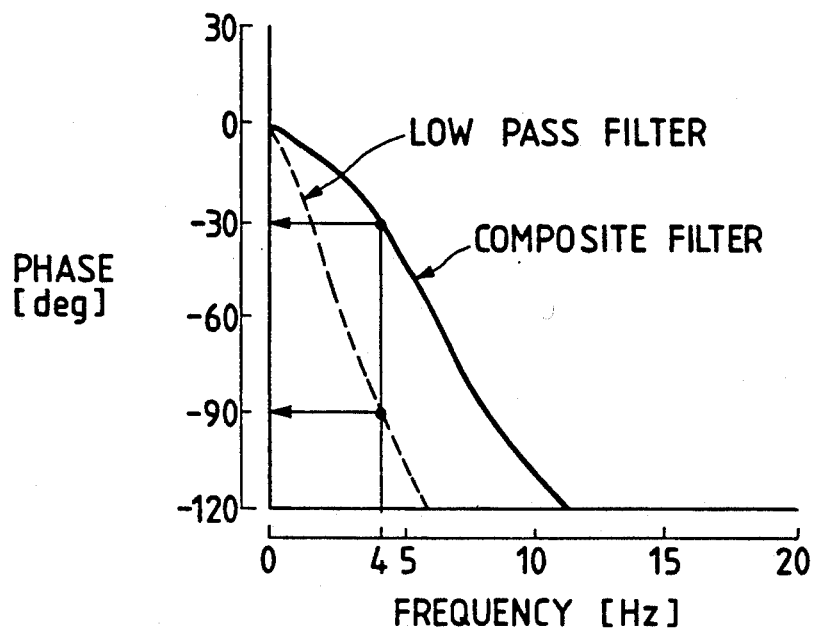
FIG. 13 is a diagram showing the phase-frequency characteristics of the composite digital filter in FIG. 12 and a simple low pass filter.

In general, as shown by the broken line of FIG. 13, a simple low pass filter provides an excessive phase delay to the processed signal in a low frequency range. For example, at frequencies around 4 Hz which correspond to the fundamental frequency components of the digital vehicle acceleration signal, the low pass filter provides a phase delay of about 90 degrees to the processed signal. Such an excessive phase delay results in a deterioration in the control for reducing the vehicle vibration.

In view of such circumstances, the digital filter 12 is composed of a composite filter having a combination of delay elements and lead (advance) elements. As shown by the solid line of FIG. 13, the digital filter 12 provides a smaller phase delay to the processed signal in a low frequency rage. For example, at frequencies around 4 Hz, the digital filter 12 provides a phase delay of about 30 degrees to the processed signal which is equal to one third of the phase delay provided by the simple low pass filter.

Specifically, the digital filter 12 is designed so that its transfer function "f" will be expressed in the following equation.

$$f = \frac{2527}{S^2 + 50.3S + 2527} + \frac{S^2 + 2.51S + 16000}{16000} \qquad (13)$$

The first term of the right-hand side of the equation (13) corresponds to the delay elements, and the second term of the right-hand side of the equation (13) corresponds to the lead (advance) elements.

Figure 14:
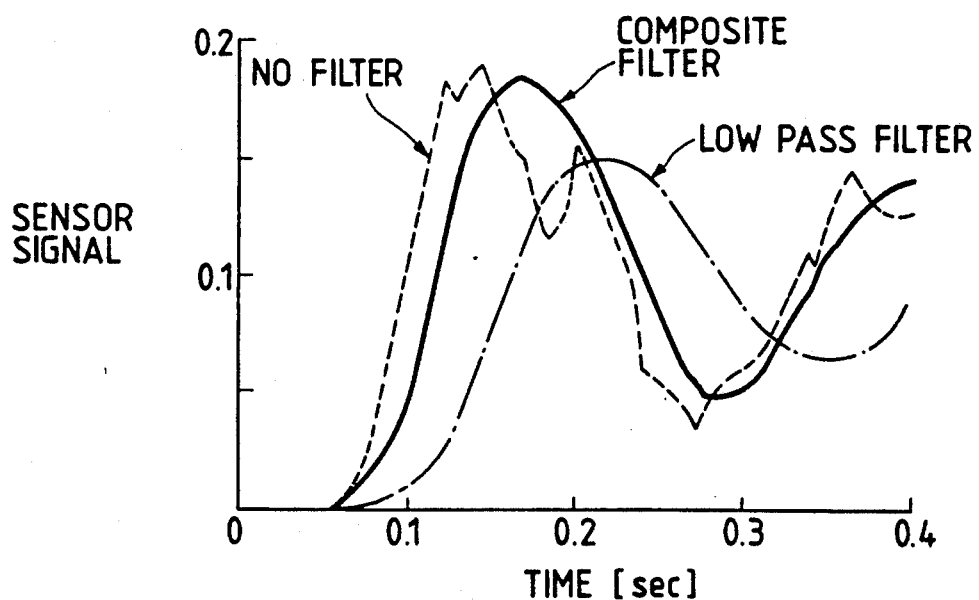
FIG. 14 is a time-domain diagram showing a variation in the result of detection by a vehicle acceleration sensor in the presence and absence of the composite digital filter of FIGS. 12 and 13 or the simple low pass filter.

FIG. 14 shows time-domain variations in the digital vehicle acceleration signal which are obtained in the presence of the digital filter 12 or the simple low pass filter, and in the absence of both the digital filter 12 and the simple low pass filter under conditions where the vehicle is accelerated on a road providing great road noise. In FIG. 14: the solid line denotes the time-domain variations in the digital vehicle acceleration signal which are obtained in the presence of the digital filter 12 according to the third embodiment; the dot-dash line denotes the time-domain variations in the digital vehicle acceleration signal which are obtained in the presence of the simple low pass filter instead of the digital filter 12; and the dash line denotes the time-domain variations in the digital vehicle acceleration signal which are obtained in the absence of both the digital filter 12 and the simple low pass filter.

As shown in FIG. 12, the digital filter 12 removes high-frequency components from the digital vehicle acceleration signal which are caused by road noise. Since the digital filter 12 provides a small phase delay to the digital vehicle acceleration signal, it is possible to prevent a deterioration in the spark timing control which would be caused by an excessive phase delay.

DESCRIPTION OF THE FOURTH PREFERRED EMBODIMENT

A fourth embodiment of this invention is similar to the embodiment of FIGS. 1–8 except for design changes described later.

In general, high-frequency noise components of the output signal from a vehicle acceleration sensor 6 (see FIG. 1) depend on the gear position of a vehicle power transmission. Specifically, the frequencies of the noise components rise as the gear position of the vehicle power transmission is shifted toward the highest-speed gear position.

Figures 15, 16:
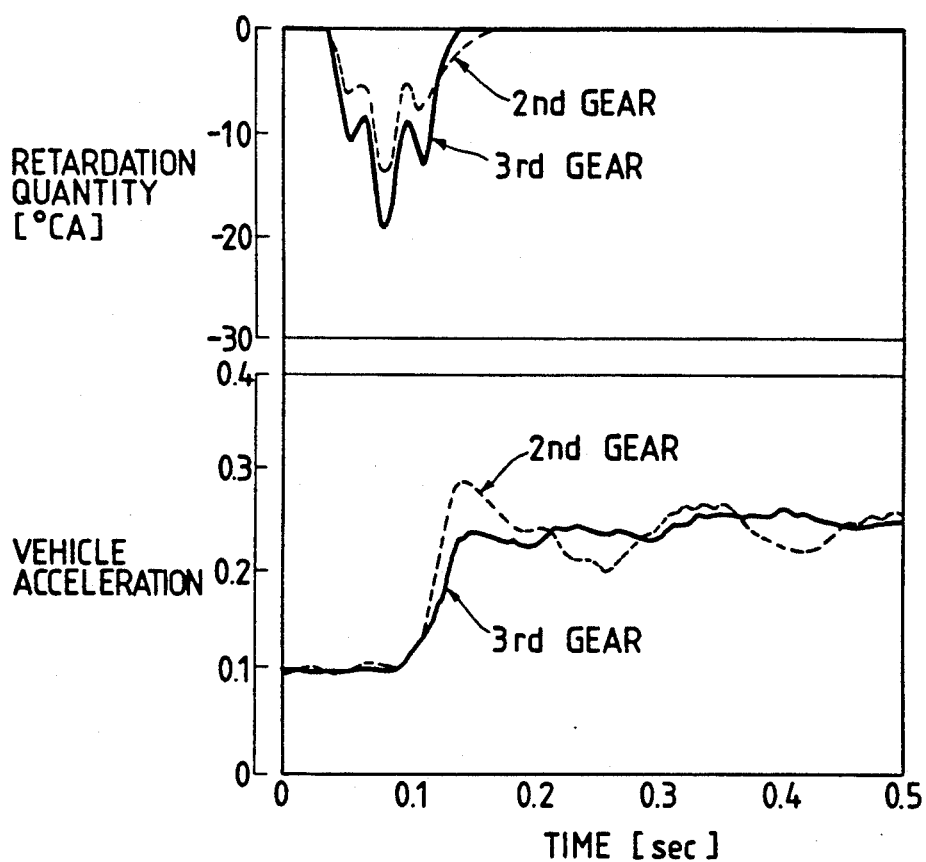
FIG. 15 is a diagram showing the relation of a gear shift position of a vehicle power transmission with optimal feedback gains and an optimal integral constant in a spark timing control system according to a fourth embodiment of this invention.
FIG. 16 is a time-domain diagram showing variations in a spark timing retardation quantity and an actual vehicle acceleration in connection with the fourth embodiment.

The fourth embodiment includes a sensor for detecting the gear position of the vehicle power transmission. As shown in FIG. 15, optimal feedback gains K1, K2, K3, K4, and K5, and an optimal integral constant Ka are changed in response to the output signal from the gear position sensor, that is, in response to the gear position of the vehicle power transmission.

FIG. 16 shows time-domain variations in a spark timing retardation quantity and an actual vehicle acceleration which are obtained under conditions where the vehicle power transmission is in a second-speed gear position or a third-speed gear position. In FIG. 16, the solid lines denote the time-domain variations in the spark timing retardation quantity and the actual vehicle acceleration which are obtained under conditions where the vehicle power transmission is in the third-speed gear position. In FIG. 16, the dash lines denote the time-domain variations in the spark timing retardation quantity and the actual vehicle acceleration which are obtained under conditions where the vehicle power transmission is in the third-speed gear position.

In this way, the characteristics of the feedback control are adjusted in accordance with the gear position of the vehicle power transmission. Thus, the feedback control can be kept reliable independent of the gear position of the vehicle power transmission.

DESCRIPTION OF THE FIFTH PREFERRED EMBODIMENT

A fifth embodiment of this invention is similar to the embodiment of FIGS. 1–8 except for a design change described hereinafter.

In the fifth embodiment, a step 170 (see FIG. 3) calculates a control torque u(i) by referring to the following equation.

$$u(i) = K_1 \cdot G(i) + K_2 \cdot G(i-1) + K_3 \cdot u(i-1) + K_4 \cdot u(i-2) + K_5 \cdot u(i-3) + D(i) + Ubi \qquad (14)$$

where Ubi denotes a base torque determined by a previous step 130 (see FIG. 3), and forms an anticipated term.

It is understood from the equation (14) that the anticipated term or the base torque Ubi occupies a larger part of the control quantity u(i) as the optimal feedback gains K1, K2, K3, K4, and K5 are decreased. In other words, the corrective weight provided by the anticipated term or the base torque Ubi increases as the optimal feedback gains K1, K2, K3, K4, and K5 are decreased. The increase in the corrective weight provided by the anticipated term or the base torque Ubi enables the feedback control to be less affected by road noise.

DESCRIPTION OF THE SIXTH PREFERRED EMBODIMENT

A sixth embodiment of this invention is similar to the embodiment of FIGS. 1–8 except for design changes described later. Specifically, the sixth embodiment includes a modified spark timing decision routine which is designed so as to correct a spark timing retardation quantity RET in response to the degree of acceleration of a vehicle.

Figure 17:
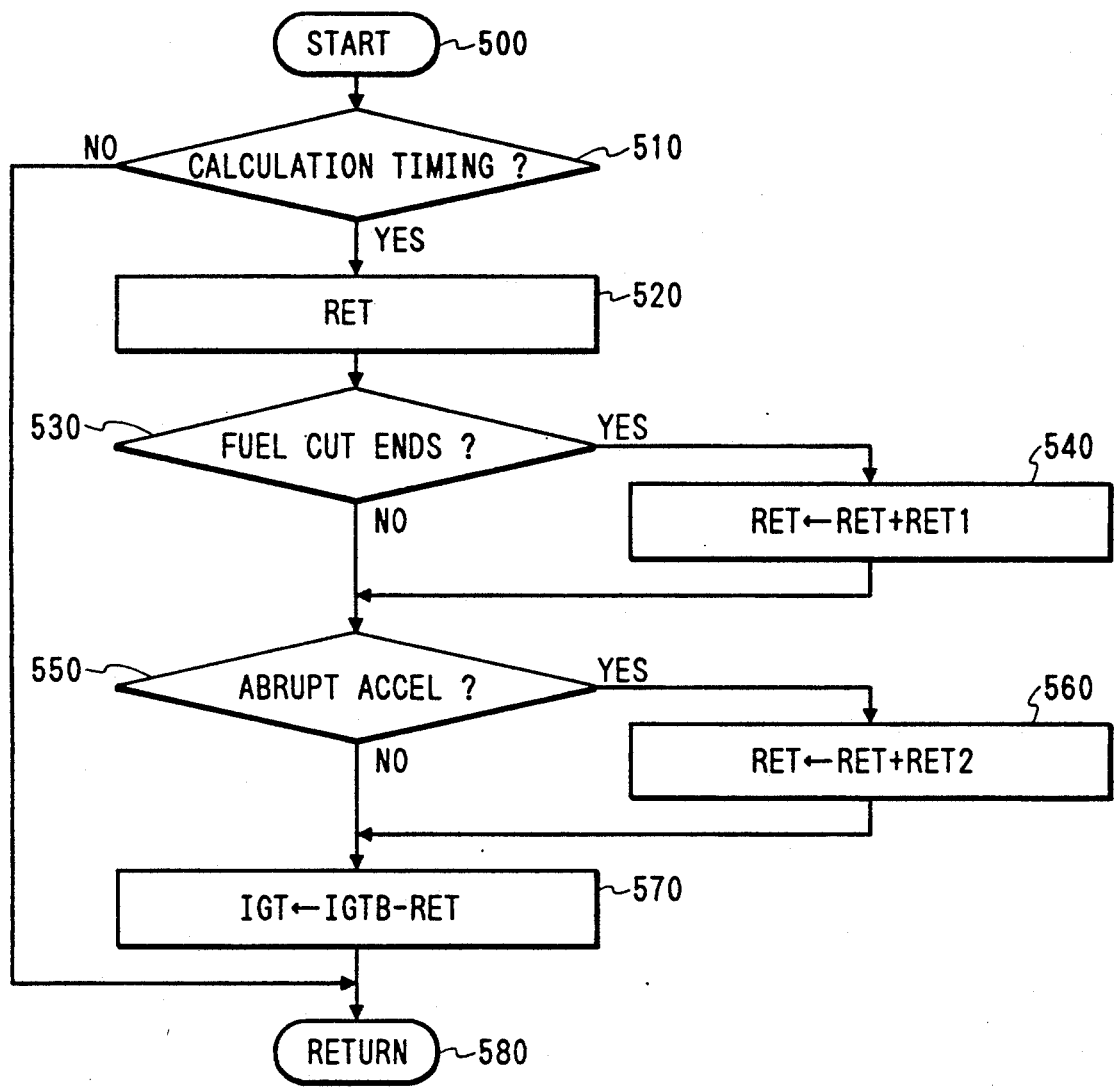
FIG. 17 is a flowchart of a part of a program controlling an ECU in a spark timing control system according to a sixth embodiment of this invention.

FIG. 17 is a flowchart of the spark timing decision routine in the sixth embodiment. As shown in FIG. 17, the spark timing decision routine starts at a step 500 and then advances to a step 510.

The step 510 judges whether or not the present moment agrees with a given timing for the calculation of a spark timing. When the present moment agrees with the given timing, the program advances to a step 520. When the present moment disagrees with the given timing, the program jumps to a step 580 and then returns to a main routine.

The step 520 reads out the spark timing retardation quantity RET from a RAM 7c (see FIG. 1). The spark timing retardation quantity RET is determined by a step 190 of a spark timing control routine (see FIG. 3).

A step 530 following the step 520 judges whether or not fuel supply to an engine is restarted, that is, whether or not the fuel cutoff is ended and thus the fuel supply is started again. This judgment is done by monitoring fuel injection pulse signals. When the fuel supply is restarted, the program advances to a step 540. In other cases, for example, in the case where the fuel supply or the fuel cutoff is continued, the program advances to a step 550.

The step 540 corrects the spark timing retardation quantity RET by incrementing the value RET by a given retardation quantity RET1. Specifically, the step 540 executes the calculation statement "RET=RET+-RET1". After the step 540, the program advances to the step 550.

The step 550 judges whether or not the vehicle is abruptly accelerated. Specifically, the step 550 calculates the rate ΔPm of a variation in an intake duct pressure Pm. Then, the step 550 compares the calculated rate ΔPm with a given threshold value to judge whether or not the vehicle is abruptly accelerated. When the calculated rate ΔPm is equal to or greater than the given threshold value, that is, when the vehicle is abruptly accelerated, the program advances to a step 560. Otherwise, the program advances to a step 570.

The step 560 corrects the spark timing retardation quantity RET by incrementing the value RET by a given retardation quantity RET2. Specifically, the step 560 executes the calculation statement "RET=RET+RET2". After the step 560, the program advances to the step 570.

The step 570 calculates a desired spark timing IGT which equals a basic spark timing IGTB minus the spark timing retardation quantity RET. Specifically, the desired spark timing IGT is calculated by referring to the equation "IGT=IGTB−RET". The basic spark timing IGTB is determined in another routine of the program which is not shown. After the step 570, the program advances to the step 580 and then returns to the main routine.

As understood from the previous description, the desired spark timing IGT is corrected in accordance with whether or not the fuel supply is restarted, and with whether or not the vehicle is abruptly accelerated. Therefore, under such conditions, the spark timing is optimally controlled so that the vehicle vibration can be effectively reduced.

DESCRIPTION OF THE SEVENTH PREFERRED EMBODIMENT

A seventh embodiment of this invention is similar to the embodiment of FIGS. 1-8 except for design changes described later. Specifically, the seventh embodiment includes a modified spark timing decision routine which is designed so as to selectively enable and disable spark timing retardation control.

Figure 18:
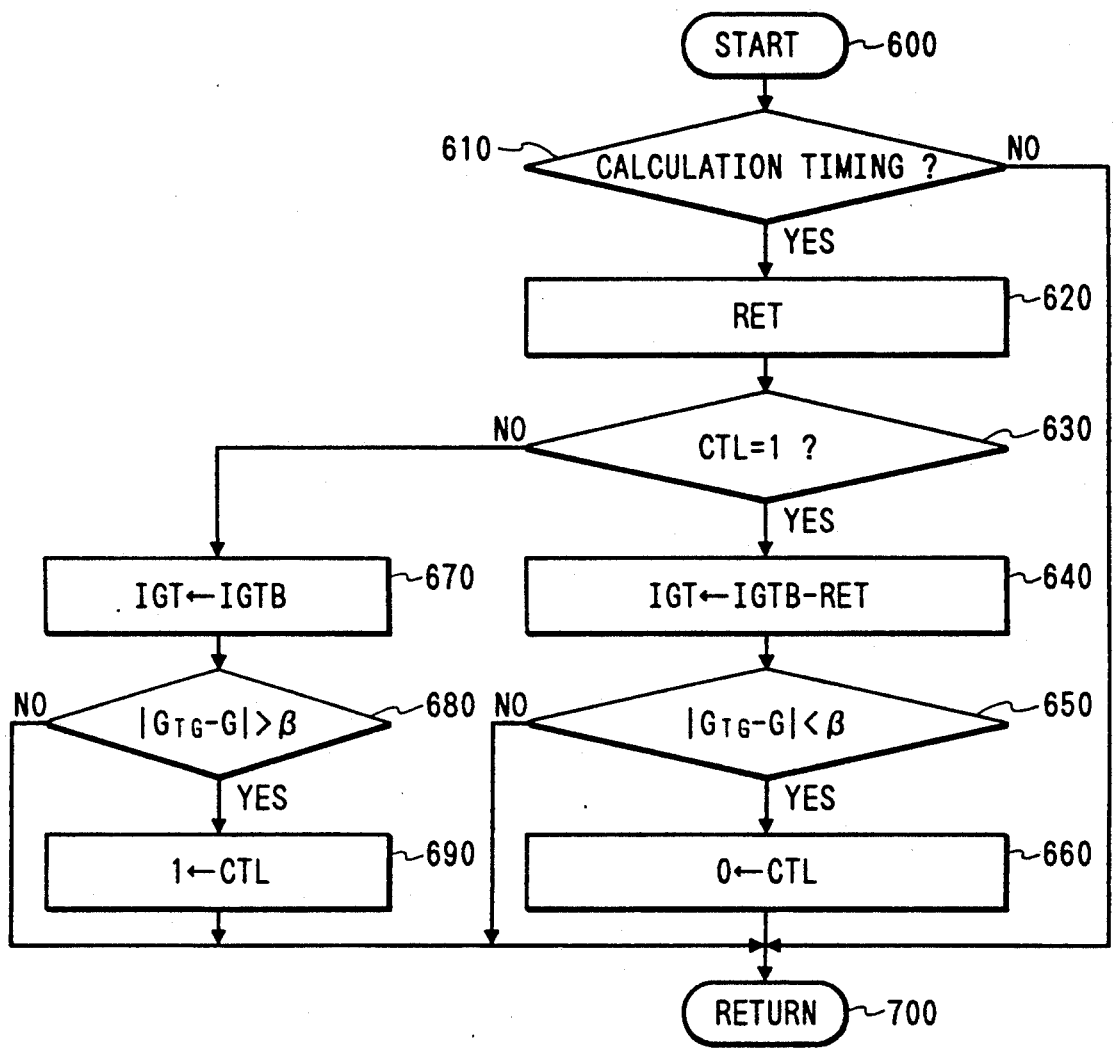
FIG. 18 is a flowchart of a part of a program controlling an ECU in a spark timing control system according to a seventh embodiment of this invention.

FIG. 18 is a flowchart of the spark timing decision routine in the seventh embodiment. As shown in FIG. 18, the spark timing decision routine starts at a step 600 and then advances to a step 610.

The step 610 judges whether or not the present moment agrees with a given timing for the calculation of a spark timing. When the present moment agrees with the given timing, the program advances to a step 620. When the present moment disagrees with the given timing, the program jumps to a step 700 and then returns to a main routine.

The step 620 reads out a spark timing retardation quantity RET from a RAM 7c (see FIG. 1). The spark timing retardation quantity RET is determined by a step 190 of a spark timing control routine (see FIG. 3).

A step 630 following the step 620 judges whether or not a flag CTL is "1". When the flag CTL is "1", the program advances to a step 640. Otherwise, the program advances to a step 670.

The step 640 calculates a desired spark timing IGT which equals a basic spark timing IGTB minus the spark timing retardation quantity RET. Specifically, the desired spark timing IGT is calculated by referring to the equation "IGT=IGTB−RET". The basic spark timing IGTB is determined in another routine of the program which is not shown. After the step 640, the program advances to a step 650.

The step 650 calculates the absolute value of the difference between a target vehicle vibration value $G_{TG}$ and an actual vehicle vibration value G. Then, the step 650 compares the difference absolute value "$|G_{TG}-G|$" with a given value β. When the difference absolute value "$|G_{TG}-G|$" is smaller than the given value β, the program advances to a step 660. Otherwise, the program advances to the step 700 and then returns to the main routine.

The step 660 sets the flag CTL to "0". After the step 660, the program advances to the step 700 and then returns to the main routine.

The step 670 sets the desired spark timing IGT equal to the basic spark timing IGTB. After the step 670, the program advances to a step 680.

The step 680 calculates the absolute value of the difference between the target vehicle vibration value $G_{TG}$ and the actual vehicle vibration value G. Then, the step 680 compares the difference absolute value "$|G_{TG}-G|$" with the given value β. When the difference absolute value "$|G_{TG}-G|$" is greater than the given value β, the program advances to a step 690. Otherwise, the program advances to the step 700 and then returns to the main routine.

The step 690 sets the flag CTL to "1". After the step 690, the program advances to the step 700 and then returns to the main routine.

As understood from the previous description, only under conditions where the absolute value of the difference between the target vehicle vibration value $G_{TG}$ and the actual vehicle vibration value G is greater than the given value β, the spark timing retardation feedback control is enabled. When the absolute value of the difference between the target vehicle vibration value $G_{TG}$ and the actual vehicle vibration value G becomes smaller than the given value β, the spark timing retardation feedback control is suspended.

Figure 19:
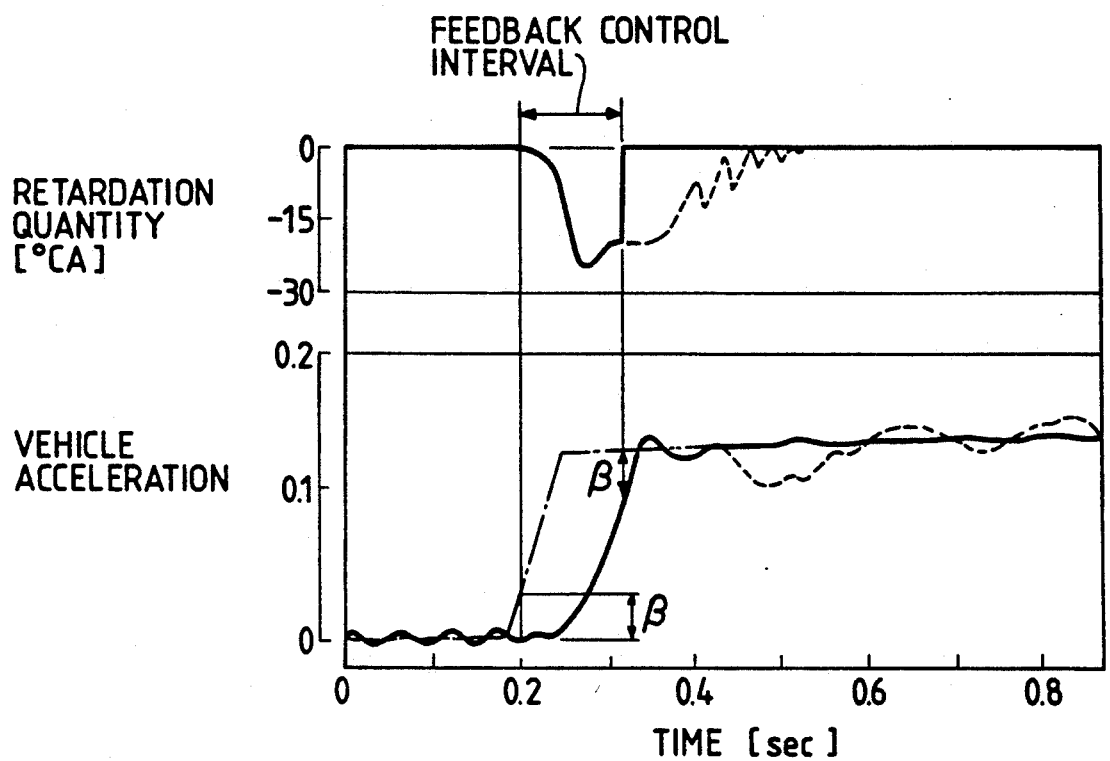
FIG. 19 is a time-domain diagram showing variations in a spark timing retardation quantity and an actual vehicle acceleration in connection with the seventh embodiment.

FIG. 19 shows time-domain variations in a spark timing retardation quantity and an actual vehicle acceleration which are obtained in the presence and absence of the selective execution of the spark timing retardation feedback control. In the part of FIG. 19 which extends rightward of a feedback control interval, the solid lines denote the time-domain variations in the spark timing retardation quantity and the actual vehicle acceleration which are obtained in the presence of the selective execution of the spark timing retardation feedback control. In the part of FIG. 19 which extends rightward of the feedback control interval, the dash lines denote the time-domain variations in the spark timing retardation quantity and the actual vehicle acceleration which are obtained in the absence of the selective execution of the spark timing retardation feedback control.

As shown in FIG. 19, the selective execution of the spark timing retardation feedback control enables the actual vehicle vibration value G to quickly reach the target vehicle vibration value $G_{TG}$.

DESCRIPTION OF THE EIGHTH PREFERRED EMBODIMENT

An eighth embodiment of this invention is similar to the embodiment of FIGS. 18 and 19 except for design changes described hereinafter.

In the eighth embodiment, a program for controlling an ECU 7 includes a model determination routine which is reiterated at a given period, for example, 8 ms, by a timer-based interruption process.

Figure 20:
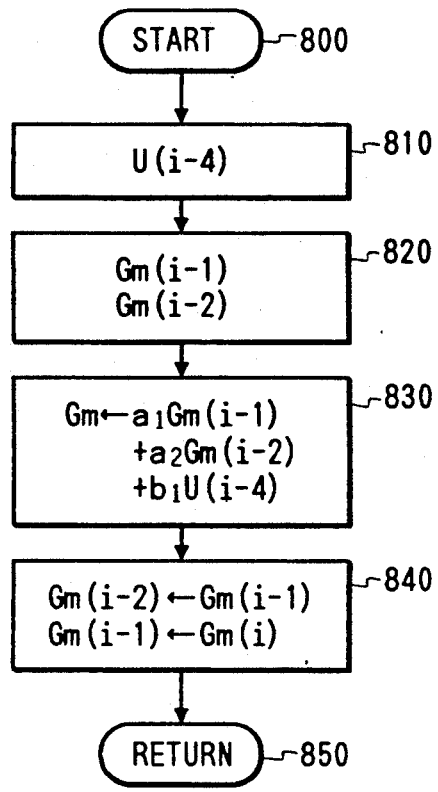
FIG. 20 is a flowchart of a part of a program controlling an ECU in a spark timing control system according to an eighth embodiment of this invention.

FIG. 20 is a flowchart of the model determination routine. As shown in FIG. 20, the model determination routine starts at a step 800 and then advances to a step 810.

The step 810 reads out a control torque u(i−4) from a RAM 7c (see FIG. 1) which precedes a current control torque u(i) by four time positions. The control torque u(i−4) is determined in a spark timing control routine (see FIG. 3).

A step 820 following the step 810 reads out vehicle vibration (acceleration) models Gm(i−1) and Gm(i−2) from the RAM 7c (see FIG. 1) which precedes a current vehicle vibration model Gm(i) by one time position and two time positions respectively.

A step 830 following the step 820 calculates the current vehicle vibration model Gm(i) on the basis of the previous control torque u(i−4) and the previous vehicle vibration models Gm(i−1) and Gm(i−2) by referring to the following equation.

$$Gm(i) = a_1 Gm(i-1) + a_2 Gm(i-2) + b_1 u(i-4) \quad (15)$$

where $a_1$, $a_2$, and $b_1$ denote predetermined model constants equal to those used in the embodiment of FIGS. 1-8.

A step 840 following the step 830 updates the previous vehicle vibration models Gm(i−1) and Gm(i−2). Specifically, the vehicle vibration model Gm(i−1) which immediately precedes the current vehicle vibration model Gm(i) is stored into the RAM 7c (see FIG. 1) as the vehicle vibration model Gm(i−2) which precedes the current vehicle vibration model Gm(i) by two time positions. The current vehicle vibration model Gm(i) is stored into the RAM 7c (see FIG. 1) as the vehicle vibration model Gm(i−1) which immediately precedes the current vehicle vibration model Gm(i). After the step 840, the program advances to a step 850 and then returns to a main routine.

In the eighth embodiment, a spark timing decision routine is modified from that of FIG. 18 as indicated later.

Figure 21:
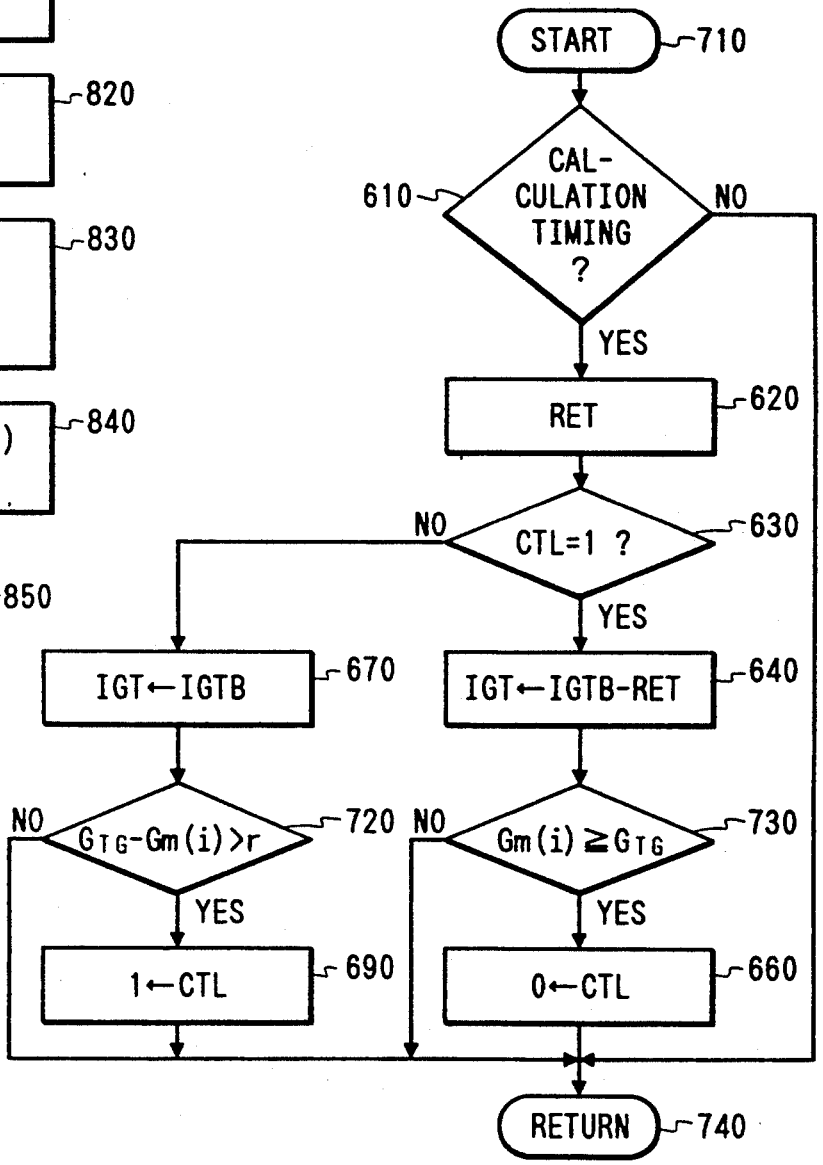
FIG. 21 is a flowchart of another part of the program controlling the ECU in the eighth embodiment.

FIG. 21 is a flowchart of the spark timing decision routine in the eighth embodiment. As shown in FIG. 21, the spark timing decision routine starts at a step 710 and then advances to a step 610.

The step 610 Judges whether or not the present moment agrees with a given timing for the calculation of a spark timing. When the present moment agrees with the given timing, the program advances to a step 620. When the present moment disagrees with the given timing, the program Jumps to a step 740 and then returns to the main routine.

The step 620 reads out a spark timing retardation quantity RET from the RAM 7c (see FIG. 1). The spark timing retardation quantity RET is determined by a step 190 of a spark timing control routine (see FIG. 3).

A step 630 following the step 620 judges whether or not a flag CTL is "1". When the flag CTL is "1", the program advances to a step 640. Otherwise, the program advances to a step 670.

The step 640 calculates a desired spark timing IGT which equals a basic spark timing. IGTB minus the spark timing retardation quantity RET. Specifically, the desired spark timing IGT is calculated by referring to the equation "IGT=IGTB−RET". The basic spark timing IGTB is determined in another routine of the program which is not shown. After the step 640, the program advances to a step 730.

The step 730 compares the vehicle vibration model Gm(i) with a target vehicle vibration value $G_{TG}$. The vehicle vibration model Gm(i) is given in the model determination routine of FIG. 20. When the vehicle vibration model Gm(i) is equal to or greater than the target vehicle vibration value $G_{TG}$, the program advances to a step 660. Otherwise, the program advances to the step 740 and then returns to the main routine.

The step 660 sets the flag CTL to "0". After the step 660, the program advances to the step 740 and then returns to the main routine.

The step 670 sets the desired spark timing IGT equal to the basic spark timing IGTB. After the step 670, the program advances to a step 720.

The step 720 calculates the difference "$G_{TG}$−Gm(i)" between the target vehicle vibration value $G_{TG}$ and the vehicle vibration model Gm(i). Then, the step 680 compares the difference "$G_{TG}$−Gm(i)" with a given value $\gamma$. When the difference "$G_{TG}$−Gm(i)" is greater than the given value %, the program advances to a step 690. Otherwise, the program advances to the step 740 and then returns to the main routine.

The step 690 sets the flag CTL to "1". After the step 690, the program advances to the step 740 and then returns to the main routine.

As understood from the previous description, the vehicle vibration model Gm(i) which is calculated according to the equation (1) is used instead of the actual vehicle vibration value G in the determination as to whether the spark timing retardation feedback control should be enabled or disabled. Therefore, it is possible to prevent the selective execution of the spark timing retardation feedback control from being affected by road noise.

Figure 22:
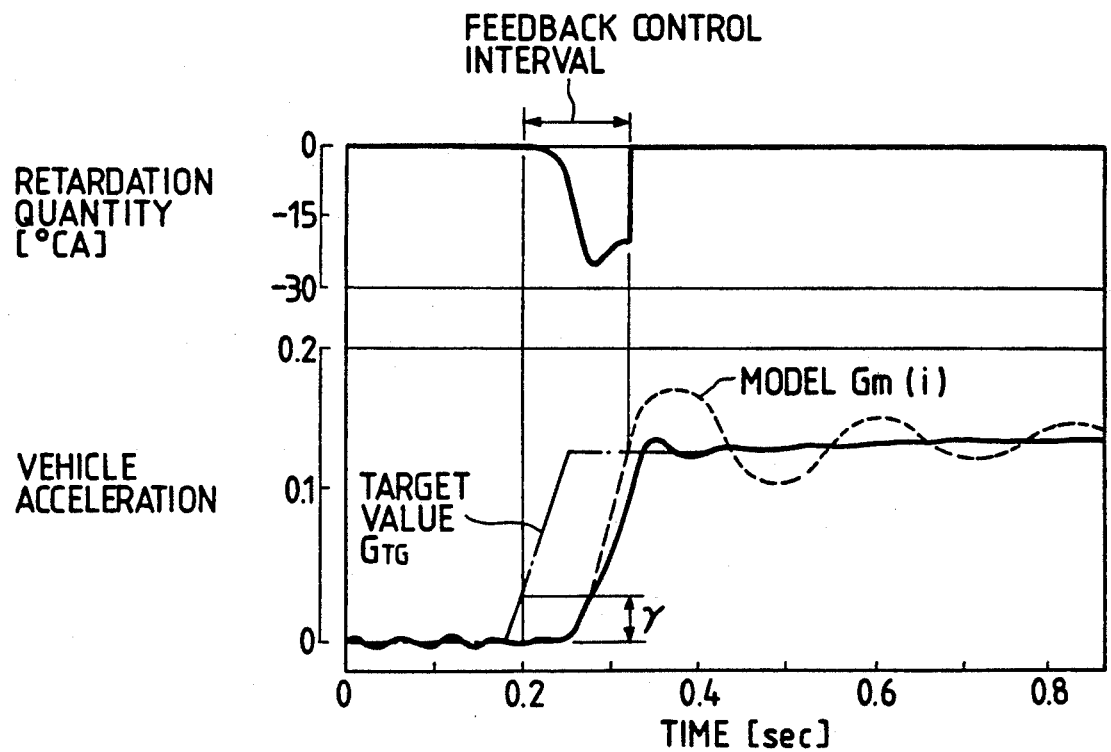
FIG. 22 is a time-domain diagram showing variations in a spark timing retardation quantity and an actual vehicle acceleration in connection with the eighth embodiment.

FIG. 22 shows time-domain variations in a spark timing retardation quantity, an actual vehicle vibration value G, a vehicle vibration model Gm(i), and a target vehicle vibration value $G_{TG}$. As shown in FIG. 22, the spark timing retardation feedback control is started when the target vehicle vibration value $G_{TG}$ becomes greater than the vehicle vibration model Gm(i) by the given value $\gamma$. In addition, the spark timing retardation feedback control is ended when the vehicle vibration mode Gm(i) becomes equal to or greater than the target vehicle vibration value $G_{TG}$.

DESCRIPTION OF THE NINTH PREFERRED EMBODIMENT

A ninth embodiment of this invention is similar to the embodiment of FIGS. 1-8 except for design changes described hereinafter. The ninth embodiment includes a spark timing decision routine equal to that of FIG. 18 or FIG. 19 in which a flag CTL is set to either "1" or "0". It should be noted that the flag CTL being "1" indicates enabling spark timing retardation feedback control while the flag CTL being "0" indicates disabling the spark timing retardation feedback control. In the ninth embodiment, a spark timing control routine is modified from that of FIG. 3.

Figure 23:
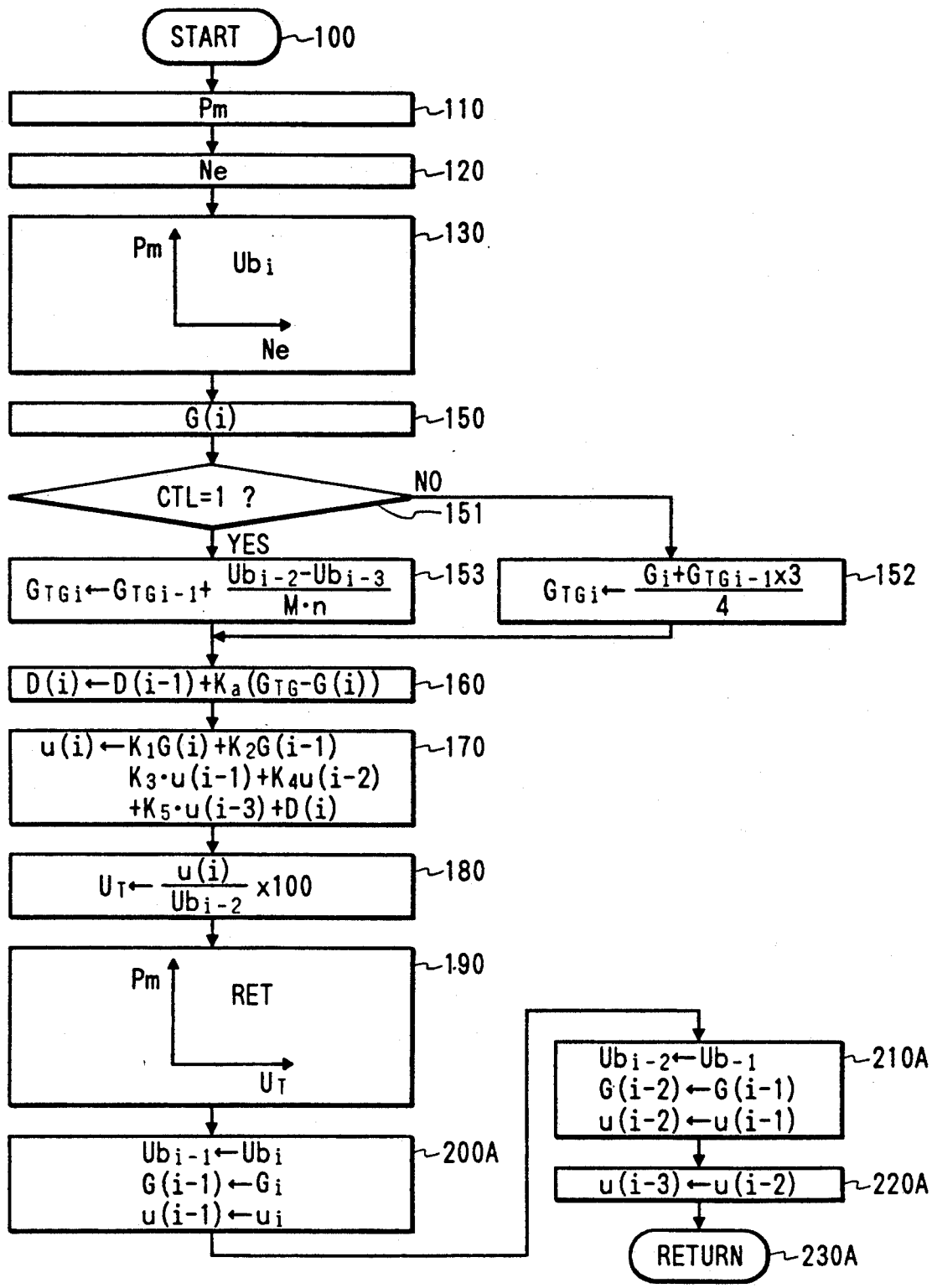
FIG. 23 is a flowchart of a part of a program controlling an ECU in a spark timing control system according to a ninth embodiment of this invention.

FIG. 23 is a flowchart of the spark timing control routine in the ninth embodiment. As shown in FIG. 23, the spark timing control routine starts at a step 100 and then advances to a step 110.

The step 110 reads out the current value Pm of an intake duct pressure from an analog-to-digital converter within an I/O port 7d (see FIG. 1) which converts the output signal from an intake duct pressure sensor 2 (see FIG. 1) into a corresponding digital signal. A step 120 following the step 110 derives the current value Ne of an engine rotational speed by referring to the output signal from a crank angle sensor 4 (see FIG. 1).

A step 130 following the step 120 determines a base torque Ubi in response to the current intake duct pressure Pm and the current engine speed Ne. Specifically, a ROM 7b (see FIG. 1) has a two-dimensional table or map in which predetermined values of the base toque are plotted as a function of the intake duct pressure and the engine speed. The base torque Ubi is determined by referring to the two-dimensional map. The base torque Ubi is defined as being equal to an engine output torque which occurs at a non-retarded spark timing. The two-dimensional map is designed so that the base torque Ubi will increase as the intake duct pressure Pm rises or the engine speed Ne rises to a given engine speed Nei.

A step 150 following the step 130 reads out the current value Gi of an actual vehicle vibration (acceleration) from an analog-to-digital converter within the I/O port 7d (see FIG. 1) which converts the output signal from a vehicle acceleration sensor 6 (see FIG. 1) into a corresponding digital signal.

A step 151 following the step 150 judges whether or not the flag CTL is "1". When the flag CTL is "1", that is, when the spark timing retardation feedback control is enabled, the program advances to a step 153. When the flag CTL is "0", that is, when the spark timing retardation feedback control is disabled, the program advances to a step 152.

The step 152 calculates a target vehicle vibration value $G_{TG}$ by referring to the following equation.

$$G_{TGi} = \{G(i) + G_{TGi} \times 3\}/4 \qquad (16)$$

where $G_{TGi}$ denotes the current target vehicle vibration value, and $G_{TGi-1}$ denotes the immediately-preceding target vehicle vibration value. As a result, when the spark timing retardation feedback control is disabled, the target vehicle vibration value $G_{TG}$ is determined on the basis of a time-domain average of the actual vehicle vibration value G.

The step 153 calculates the target vehicle vibration value $G_{TG}$ by referring to the following equation.

$$G_{TGi} = G_{TGi-1} + (U_{bi-2} - U_{bi-3})/M \cdot n \qquad (17)$$

where $G_{TGi}$ denotes the current target vehicle vibration value; $G_{TGi-1}$ denotes the immediately-preceding target vehicle vibration value; $U_{bi-2}$ denotes the base torque calculated in the execution cycle of the program which precedes the current execution cycle of the program by two cycles; $U_{bi-3}$ denotes the base torque calculated in the execution cycle of the program which precedes the current execution cycle of the program by three cycles; M denotes the weight of a vehicle; and "n" denotes the gear ratio in the power transmission of the vehicle.

A step 160 following the steps 152 and 153 calculates an integral term D(i) by referring to the previously-mentioned equation (9). It should be noted that the integral constant Ka is equal to a predetermined fixed value.

A step 170 following the step 160 calculates a control torque u(i) by referring to the previously-mentioned equation (8).

A step 180 following the step 170 calculates a torque generation rate $U_T$ from the control torque u(i) and the previous base torque $U_{bi-2}$ by referring to the previously-mentioned equation (12).

A step 190 following the step 180 determines a spark timing retardation quantity RET in response to the torque generation rate $U_T$ and the intake duct pressure Pro. Specifically, the ROM 7b (see FIG. 1) has a two-dimensional table or map in which predetermined values of the spark timing retardation quantity are plotted as a function of the torque generation rate and the intake duct pressure. The spark timing retardation quantity RET is determined by referring to the two-dimensional map. The two-dimensional map is designed so that the spark timing retardation quantity RET will decrease as the torque generation rate $U_T$ or the intake duct pressure Pm increases. The step 190 stores the determined spark timing retardation quantity RET into the RAM 7c (see FIG. 1).

A step 200A following the step 190 updates the previous values $U_{bi-1}$, G(i-1), and u(i-1). Specifically, the current base torque $U_{bi}$ is stored into the RAM 7c (see FIG. 1) as the base torque $U_{bi-1}$ which immediately precedes the current base torque Ubi. The current actual vehicle vibration value G(i) is stored into the RAM 7c (see FIG. 1) as the actual vehicle vibration value G(i-1) which immediately precedes the current actual vehicle vibration value G(i). The current control torque u(i) is stored into the RAM 7c (see FIG. 1) as the control torque u(i-1) which immediately precedes the current control torque u(i).

A step 210A following the step 200A updates the previous values $U_{bi2}$, G(i-2), and u(i-2). Specifically, the base torque $U_{bi-1}$ which immediately precedes the current base torque Ubi is stored into the RAM 7c (see FIG. 1) as the base torque $U_{bi2}$ which precedes the current base torque Ubi by two time positions. The actual vehicle vibration value G(i-1) which immediately precedes the current actual vehicle vibration value G(i) is stored into the RAM 7c (see FIG. 1) as the actual vehicle vibration value G(i-2) which precedes the current actual vehicle vibration value G(i) by two time positions. The control torque u(i-1) which immediately precedes the current control torque u(i) is stored into the RAM 7c (see FIG. 1) as the control torque u(i-2) which precedes the current control torque u(i) by two time positions.

A step 220A following the step 210A updates the previous control torque u(i-3). Specifically, the control torque u(i-2) which precedes the current control torque u(i) by two time positions is stored into the RAM 7c (see FIG. 1) as the control torque u(i-3) which precedes the current control torque u(i) by three time positions. After the step 220A, the program advances to a step 230A and then returns to a main routine.

Figure 24:
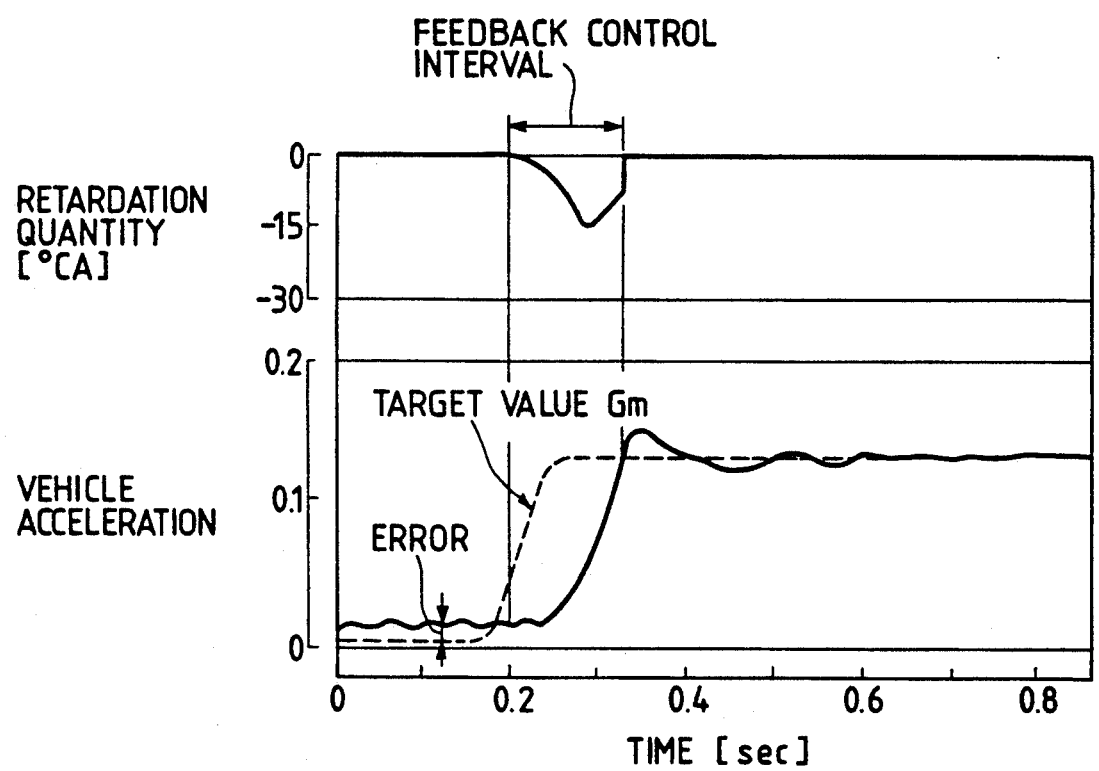
FIG. 24 is a time-domain diagram showing variations in a spark timing retardation quantity and an actual vehicle acceleration in connection with the ninth embodiment.

FIG. 24 shows time-domain variations in a spark timing retardation quantity, an actual vehicle vibration value G, and a target vehicle vibration value $G_{TG}$ which are obtained in the ninth embodiment. As described previously, the target vehicle vibration value $G_{TG}$ is determined on the basis of a time-domain average of the actual vehicle vibration value G when the spark timing retardation feedback control is disabled. This design provides an advantage such that the spark timing retardation feedback control is appropriately enabled and disabled while an excessive deviation of the actual vehicle vibration value G from the target vehicle vibration value $G_{TG}$ is prevented. This advantage is shown in FIG. 24.

DESCRIPTION OF THE TENTH PREFERRED EMBODIMENT

A tenth embodiment of this invention is similar to the embodiment of FIGS. 1-8 except for design changes described hereinafter. The tenth embodiment includes a spark timing decision routine equal to that of FIG. 18 or FIG. 19 in which a flag CTL is set to either "1" or "0". It should be noted that the flag CTL being "1" indicates enabling spark timing retardation feedback control while the flag CTL being "0" indicates disabling the spark timing retardation feedback control. In the tenth embodiment, a spark timing control routine is modified from that of FIG. 3.

Figure 25:
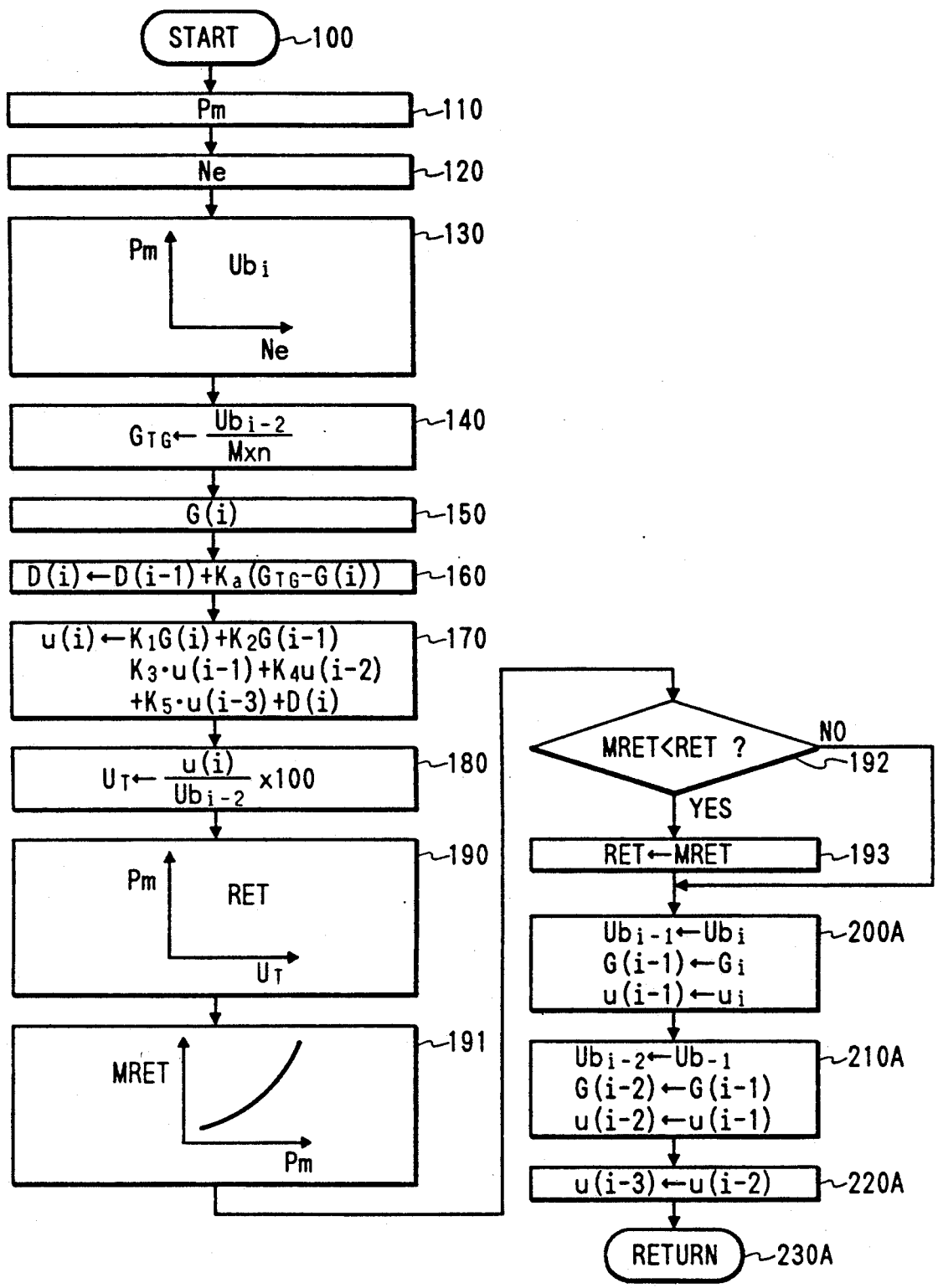
FIG. 25 is a flowchart of a part of a program controlling an ECU in a spark timing control system according to a tenth embodiment of this invention.

FIG. 25 is a flowchart of the spark timing control routine in the tenth embodiment. The part of the spark timing control routine of FIG. 25 which has steps 100-190 is similar to the corresponding part of the spark timing control routine of FIG. 3.

Figure 26:
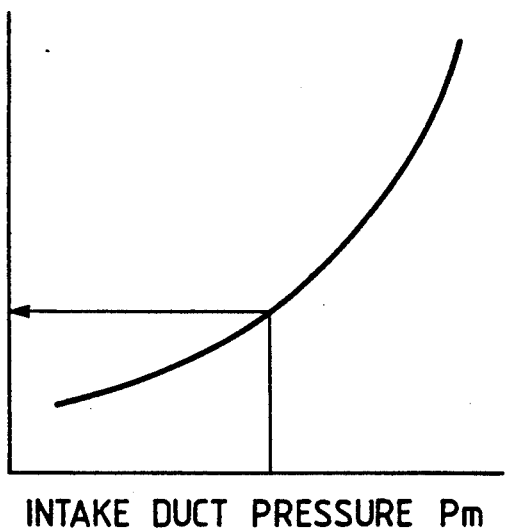
FIG. 26 is a diagram showing a map for setting an upper limit of a spark timing retardation quantity in the tenth embodiment.

As shown In FIG. 25, the step 190 is followed by a step 191. The step 191 determines the upper limit MRET of a spark timing retardation quantity in response to an intake duct pressure Pm. Specifically, a ROM 7b (see FIG. 1) has a table or map such as shown in FIG. 26 In which predetermined values of the spark timing retardation quantity upper limit are plotted as a function of the intake duct pressure. The spark timing retardation quantity upper limit MRET is determined by referring to the map of FIG. 26. The map of FIG. 26 is designed so that the spark timing retardation quantity upper limit MRET will increase as the intake duct pressure Pm increases.

Figure 27:
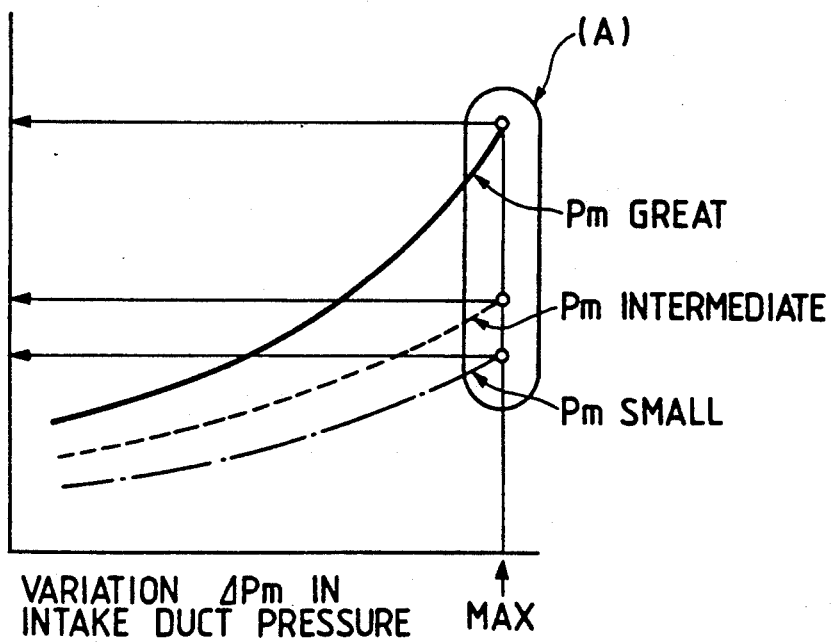
FIG. 27 is a diagram showing a relation between an actual vehicle vibration value and a variation in an intake duct pressure in the tenth embodiment.

The map of FIG. 26 is previously made through experiments. During the experiments, the relation of the actual vehicle vibration value G with the variation $\Delta Pm$ in the intake duct pressure Pm is determined while the intake duct pressure Pm is varied. FIG. 27 shows the determined relation of the actual vehicle vibration value G with the variation $\Delta Pm$ in the intake duct pressure Pm. The upper limits MRET of the spark timing retardation quantity are set equal to the values RET of the spark timing retardation quantity so that it is possible to effectively reduce the actual vehicle vibration values G which would occur when the variations $\Delta Pm$ in the intake duct pressure Pm are maximized as denoted by the character (A) in FIG. 27.

A step 192 following the step 191 compares the spark timing retardation quantity RET and the spark timing retardation quantity upper limit MRET. When the spark timing retardation quantity RET is greater than the spark timing retardation quantity upper limit MRET, the program advances to a step 193. Otherwise, the program advances to a step 200A.

The step 193 updates the spark timing retardation quantity RET to the spark timing retardation quantity upper limit MRET by setting the value RET equal to the value MRET. After the step 193, the program advances to the step 200A.

The step 200A updates the previous values $U_{bi-1}$, $G(i-1)$, and $u(i-1)$. Specifically, the current base torque $U_{bi}$ is stored into the RAM 7c (see FIG. 1) as the base torque $U_{bi-1}$ which immediately precedes the current base torque Ubi. The current actual vehicle vibration value G(i) is stored into the RAM 7c (see FIG. 1) as the actual vehicle vibration value G(i−1) which immediately precedes the current actual vehicle vibration value G(i). The current control torque u(i) is stored into the RAM 7c (see FIG. 1) as the control torque u(i−1) which immediately precedes the current control torque u(i).

A step 210A following the step 200A updates the previous values $U_{bi-2}$, G(i−2), and u(i−2). Specifically, the base torque $U_{bi-1}$ which immediately precedes the current base torque Ubi is stored into the RAM 7c (see FIG. 1) as the base torque $U_{bi2}$ which precedes the current base torque Ubi by two time positions. The actual vehicle vibration value G(i−1) which immediately precedes the current actual vehicle vibration value G(i) is stored into the RAM 7c (see FIG. 1) as the actual vehicle vibration value G(i−2) which precedes the current actual vehicle vibration value G(i) by two time positions. The control torque u(i−1) which immediately precedes the current control torque u(i) is stored into the RAM 7c (see FIG. as the control torque u(i−2) which precedes the current control torque u(i) by two time positions.

A step 220A following the step 210A updates the previous control torque u(i−3). Specifically, the control torque u(i−2) which precedes the current control torque u(i) by two time positions is stored into the RAM 7c (see FIG. 1) as the control torque u(i−3) which precedes the current control torque u(i) by three time positions. After the step 220A, the program advances to a step 230A and then returns to a main routine.

As understood from the previous description, in the tenth embodiment, the spark timing retardation quantity RET is limited to the rage equal to or below the value MRET. The limitation on the spark timing retardation quantity RET prevents the spark timing retardation quantity RET from being excessively large at small engine loads. In addition, the limitation on the spark timing retardation quantity prevents an unreliability in the spark timing retardation feedback control which might be caused by road noise.

What is claimed is:

1. A spark timing control system for reducing vehicle vibration, comprising:
   detection means for detecting at least one parameter of an engine;
   vehicle vibration detecting means for detecting a vibration of a vehicle in a longitudinal direction with respect to said vehicle;
   target vehicle vibration value calculating means for calculating a target vehicle vibration based on at least one of said detected vehicle vibration and at least of said detected engine parameters;
   error signal generating means for generating an error signal based on a comparison of said detected vehicle vibration to said target vehicle vibration;
   gain selecting means for selecting a gain based on at least one of said detected engine parameters, said gain representing a proportional amount by which said error signal influences spark timing control;
   control quantity setting means for determining a spark timing control quantity based on said error signal as modified by said selected gain; and
   spark timing control means for controlling said spark timing in accordance with said control quantity.

2. The spark timing control system of claim 1, wherein said detecting means comprises engine speed detecting means for detecting a rotational speed of the engine, and load detecting means for detecting a load on the engine.

3. The spark timing control system of claim 1, wherein said gain selecting means selects said gain in response to said detected vehicle vibration.

4. The spark timing system of claim 1, wherein said detection means includes means for detecting a gear shift position of a power transmission of the vehicle, and wherein said gain selecting means selects said gain in response to said detected gear shift position.

5. The spark timing control system of claim 1, further comprising a composite filter for removing noise from a detection signal output from said vehicle vibration detecting means, and means for feeding said detection signal from said vehicle vibration detecting means to said error signal generating means via said composite filter, said composite filter having a combination of a delay element and a lead element.

6. The spark timing control system of claim 1, further comprising means for correcting sid control quantity set by said control quantity setting means in response to at least one of said detected engine parameters.

7. The spark timing control system of claim 1, further comprising means for disabling said spark timing control means from controlling spark timing in accordance with said control quantity in response to said detected vehicle vibration.

8. The spark timing control system of claim 1, further comprising means for disabling said spark timing control means from controlling spark timing in accordance with said control quantity in response to said target vehicle vibration.

9. The spark timing control system of claim 1, further comprising means for setting an upper limit of said control quantity on the basis of at least one of said detected engine parameters, and means for, in cases where said control quantity is greater than said upper limit, updating said control quantity to said upper limit.

10. The spark timing control system of claim 1, wherein said target vehicle vibration value calculating means comprises means for calculating a base torque of said engine on the basis of at least one of said detected engine parameters, and means for generating said target vehicle vibration value on the basis of said calculated base torque, a weight of the vehicle, and a gear ratio of a power transmission of the vehicle.

11. The spark timing control system of claim 10, wherein said error signal generating means comprises means for calculating a value of an integral of a difference between said target vehicle vibration and said detected vehicle vibration, and said control quantity setting means comprising means for calculating a control torque on the basis of said calculated integral value and said vehicle vibration, means for calculating a torque generation rate on the basis of said calculated control torque and said base torque, and mean for generating a retardation quantity of the spark timing on the basis of said calculated torque generation rate and at least one of said detected engine parameters.

12. The spark timing control system of claim 1, wherein said control quantity setting means determines said control quantity based on said error signal as modified by said selected gain and a previously detected vehicle vibration.

13. The spark timing control system of claim 12, wherein
said gain selecting means selects a second gain based on at least one of said detected engine parameters, said gain representing a proportional amount by which a previously detected vehicle vibration influences spark timing control; and
said control quantity setting means determines said control quantity based on said error signal as modified by said selected gain and a previously detected vehicle vibration as modified by said second selected gain.

14. The spark timing control system of claim 12, wherein
said gain selecting means selects a second gain and a third gain based on at least one of said detected engine parameters, said second gain and said third gain respectively representing a proportional amount by which a previously detected vehicle vibration and previously determined control quantity influence spark timing control; and
said control quantity setting means determines said control quantity based on the error signal as modified by said selected gain and said previously determined control quantity as modified by said second selected gain.

15. The spark timing control system of claim 12, wherein
said gain selecting means selects a second gain and a third gain based on at least one of said detected engine parameters, said second gain and said third gain respectively representing a proportional amount by which a previously detected vehicle vibration and a previously determined control quantity influence spark timing control; and
said control quantity setting means determines said control quantity based on said error signal as modified by said selected gain, said previously detected vehicle vibration as modified by said second selected gain, and said previously determined control quantity as modified by said third selected gain.

16. The spark timing control system of claim 1, wherein said control quantity setting means determines said control quantity based on said error signal as modified by said selected gain and at least one previously determined control quantity.

17. The spark timing control system of claim 1, wherein said control quantity setting means determines said control quantity based on said error signal as modified by said selected gain, a previously detected vehicle vibration, and at least one previously determined control quantity.

18. A spark timing control system for reducing vehicle vibration, comprising:
detection means for detecting at least one parameter of an engine;
vehicle vibration detecting means for detecting a vibration of a vehicle in a longitudinal direction with respect to said vehicle;
target vehicle vibration value calculating means for calculating a variable target vehicle vibration based on at least one of said detected vehicle vibration and at least one of said detected engine parameters;
error signal generating means for generating an error signal based on a comparison of said detected vehicle vibration to said target vehicle vibration;
control quantity setting means for determining a spark timing control quantity based on said error signal; and
spark timing control means for controlling said spark timing in accordance with said control quantity so that said detected vehicle vibration follows said target vehicle vibration.

19. The spark timing control system of claim 18, wherein said target vehicle vibration value calculating means comprises means for calculating a base torque of said engine on the basis of at least one of said detected engine parameters, and means for generating said target vehicle vibration value on the basis of said calculated base torque, a weight of the vehicle, and a gear ratio of a power transmission of said vehicle.

20. The spark timing control system of claim 19, wherein said error signal generating means comprises means for calculating a value of an integral of a difference between said target vehicle vibration and said detected vehicle vibration, and said control quantity setting means comprising means for calculating a control torque on the basis of said calculated integral value and said detected vehicle vibration, means for calculating a torque generation rate on the basis of said calculated control torque and said base torque, and means for generating a retardation quantity of basis spark timing on said basis of the calculated torque generation rate and at least one of said detected engine parameters.

21. The spark timing control system of claim 18, wherein said control quantity setting means determines said control quantity based on said error signal and a previously detected vehicle vibration.

22. The spark timing control system of claim 18, wherein said control quantity setting means determines said control quantity based on said error signal and at least one previously determined control quantity.

23. The spark timing control system of claim 18, wherein said control quantity setting means determines said control quantity based on said error signal, a previously detected vehicle vibration, and at least one previously determined control quantity.

24. A spark timing control system, comprising:
   detecting means for detecting at least one parameter of an engine;
   means for detecting an actual acceleration of a vehicle;
   means for calculating a variable target acceleration of said vehicle based on at least one of said actual acceleration and at least one of said detected engine parameters;
   error signal generating means for generating an error signal based on a comparison of said detected actual acceleration to said target acceleration;
   control quantity setting means for determining a spark timing control quantity based on said error signal; and
   spark timing control means for controlling spark timing in accordance with said control quantity so that actual acceleration follows said target acceleration.

25. The spark timing control system of claim 24, wherein said control quantity setting means determines said control quantity based on said error signal and a previously detected actual acceleration.

26. The spark timing control system of claim 24, wherein said control quantity setting means determines said control quantity based on said error signal and at least one previously determined control quantity.

27. The spark timing control system of claim 24, wherein said control quantity setting means determines said control quantity based on said error signal, a previously detected actual acceleration, and at least one previously determined control quantity.

28. An engine torque control system for reducing vehicle vibration, comprising:
   detection means for detecting a least one parameter on an engine;
   vehicle vibration detecting means for detecting a vibration of a vehicle in a longitudinal direction with respect to said vehicle;
   target vehicle vibration value calculating means for calculating a target vehicle vibration based on at least one of said detected vehicle vibration and at least one of said detected engine parameters;
   error signal generating mean for generating an error signal based on a comparison of said detected vehicle vibration to said target vehicle vibration;
   gain selecting means for selecting a gain based on at least one of said detected engine parameters, said gain representing a proportional amount by which said error signal influences spark timing control;
   control quantity setting means for determining a torque control quantity based on said error signal as modified by said selected gain; and
   torque control means for controlling said engine torque in accordance with said torque control quantity.

29. A torque control system for reducing vehicle vibration, comprising:
   detection means for detecting at least one parameter of an engine;
   vehicle vibration detecting means for detecting a vibration of a vehicle in a longitudinal direction with respect to said vehicle;
   target vehicle vibration value calculating means for calculating a variable target vehicle vibration based on at least one of said detected vehicle vibration and at least one of said detected engine parameters;
   error signal generating means for generating an error signal based on a comparison of said detected vehicle vibration to said target vehicle vibration;
   control quantity setting means for determining a torque control quantity based on said error signal; and
   torque control means for controlling the engine torque in accordance with said torque control quantity so that said detected engine vehicle vibration follows said target vehicle vibration.

30. A torque control system for reducing vehicle vibration, comprising:
   detecting means for detecting at least one parameter of an engine;
   means for detecting an actual acceleration of a vehicle;
   means for calculating a target acceleration of said vehicle based on at least one of said actual acceleration and at least one of said detected engine parameters;
   error signal generating means for generating an error signal based on a comparison of said actual acceleration to said target acceleration;
   control quantity setting means for determining a torque control quantity based on said error signal; and
   torque control means for controlling engine torque in accordance with said torque control quantity so that said actual acceleration follows said target acceleration.

31. A spark timing control system for reducing vehicle vibration, comprising:
   detection means for detecting at least one engine parameter;

vehicle vibration detecting means for detecting a vibration of a vehicle in a longitudinal direction with respect to said vehicle;

gain selecting means for selecting a gain based on at least one of said detected engine parameters, said gain representing a proportional amount by which said detected vehicle vibration influences spark timing control;

control quantity setting means for determining a spark timing control quantity based on said detected vehicle vibration as modified by said selected gain; and spark timing control means for controlling spark timing in accordance with said spark timing control quantity.

32. A spark timing control system for reducing vehicle vibration, comprising:

detection means for detecting at least one parameter of an engine;

vehicle vibration detecting means for detecting a vibration of a vehicle in a longitudinal direction with respect to said vehicle;

target vehicle vibration value calculating means for calculating a variable target vehicle vibration based on at least one of said detected vehicle vibration and at least one of said detected engine parameters; and spark timing control means for controlling spark timing in accordance with said detected vehicle vibration and said variable target vehicle vibration so that said detected vehicle vibration follows said target vehicle vibration.

33. A spark timing control system, comprising:

detecting means for detecting at least one parameter of an engine;

means for detecting an actual acceleration of a vehicle;

means for calculating a variable target acceleration of said vehicle based on at least one of said actual acceleration and at least one of said detected engine parameters; and spark timing control means for controlling spark timing in accordance with said actual acceleration and said variable target acceleration so that said actual acceleration follows said target acceleration.

34. A torque control system for reducing vehicle vibration, comprising:

detecting means for detecting at least one engine parameter;

vehicle vibration detecting means for detecting a vibration of a vehicle in a longitudinal direction with respect to said vehicle;

gain selecting means for selecting a gain based on at least one of said detected engine parameters, said gain representing a proportional amount by which said detected vehicle vibration influences spark timing control;

control quantity setting means for determining a torque control quantity based on said detected vehicle vibration as modified by said selected gain; and torque control means for controlling engine torque in accordance with said torque control quantity.

35. A torque control system for reducing vehicle vibration, comprising:

detection means for detecting at least one parameter of an engine;

vehicle vibration detecting means for detecting a vibration of a vehicle in a longitudinal direction with respect to said vehicle;

target vehicle vibration value calculating means for calculating a variable target vehicle vibration based on at least one of said detected vehicle vibration and at least one of said detected engine parameters; and torque control means for controlling engine torque in accordance with said detected vehicle vibration and said variable target vehicle vibration so that said detected vehicle vibration follows said target vehicle vibration.

36. A torque control system, comprising:

detecting means for detecting at least one parameter of an engine;

means for detecting an actual acceleration of a vehicle;

means for calculating a variable target acceleration of said vehicle based on at least one of said actual acceleration and at least one of said detected engine parameters; and torque control means for controlling engine torque in accordance with said actual acceleration and said variable target acceleration so that said actual acceleration follows said target acceleration.

37. A system for controlling a vehicle driven by a spark-ignition engine, the system comprising:

detecting means for detecting at least one parameter of an engine;

means for detecting an actual acceleration of a vehicle;

means for determining a target acceleration of said vehicle based on at least one of said detected actual acceleration and at least one of said detected engine parameters;

means for determining a first calculation component of a desired spark timing in response to said detected signal acceleration;

means for determining a second calculation component of said desired spark timing in response to a previous desired spark timing;

means for determining a third calculation component of said desired spark timing in response to a difference between said detected actual acceleration and said determined target acceleration;

means for determining said desired spark timing based on said first, second, and third calculation components; and means for controlling an actual spark timing of said engine in accordance with said desired spark timing.

* * * * *